US011328144B2

(12) United States Patent
Powell et al.

(10) Patent No.: US 11,328,144 B2
(45) Date of Patent: *May 10, 2022

(54) AUXILIARY DATA MANAGEMENT SYSTEM

(71) Applicant: The Code Corporation, Murray, UT (US)

(72) Inventors: George Powell, Draper, UT (US); John Deal, Springfield, PA (US)

(73) Assignee: The Code Corporation, Murray, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,400

(22) Filed: Aug. 31, 2020

(65) Prior Publication Data

US 2021/0056274 A1    Feb. 25, 2021

Related U.S. Application Data

(63) Continuation of application No. 16/247,550, filed on Jan. 14, 2019, now Pat. No. 10,762,316.

(51) Int. Cl.
  *G06F 7/00*     (2006.01)
  *G06K 7/14*     (2006.01)
  *G06K 17/00*    (2006.01)
  *G06K 19/06*    (2006.01)

(52) U.S. Cl.
  CPC ....... *G06K 7/1413* (2013.01); *G06K 17/0022* (2013.01); *G06K 19/06028* (2013.01)

(58) Field of Classification Search
  CPC .... G06Q 10/0633; G06Q 10/06; G16H 10/40; G16H 40/20; G16H 40/67
  See application file for complete search history.

(56) References Cited

U.S. PATENT DOCUMENTS

| 10,762,316 B2 * | 9/2020 | Powell ............... G07G 1/14 |
| 2007/0177824 A1 * | 8/2007 | Cattrone ............ G06F 16/93 |
| | | 382/306 |
| 2009/0222746 A1 * | 9/2009 | Chirica ............ G06Q 10/06 |
| | | 715/762 |
| 2009/0316977 A1 * | 12/2009 | Juncker ............ G16H 40/20 |
| | | 382/133 |
| 2012/0062934 A1 * | 3/2012 | Hoarau ........... G06Q 10/0639 |
| | | 358/1.15 |
| 2013/0296175 A1 * | 11/2013 | Rafnar ............ G16B 20/20 |
| | | 506/2 |

(Continued)

Primary Examiner — Thien M Le
(74) Attorney, Agent, or Firm — Thomas M. Hardman

(57) ABSTRACT

A system may include a plurality of stations that implement a workflow process. The workflow process may include reading a barcode in connection with at least some of the plurality of stations. The barcode may be attached to an item that is moved between the plurality of stations during the workflow process. The system may additionally include a plurality of devices. Each of the plurality of devices may be located at one of the plurality of stations. At least some of the plurality of devices may include barcode reading capability. The system may additionally include process management code stored in memory on at least some of the plurality of devices. The process management code may be executable by one or more processors on the plurality of devices to determine auxiliary data corresponding to the workflow process and send the auxiliary data to a server.

20 Claims, 16 Drawing Sheets

(56) References Cited

U.S. PATENT DOCUMENTS

| | | | | |
|---|---|---|---|---|
| 2014/0080727 A1* | 3/2014 | Sulem | ............... | C12Q 1/6883 |
| | | | | 506/9 |
| 2014/0124579 A1* | 5/2014 | Ding | ............... | G06K 7/10732 |
| | | | | 235/455 |
| 2014/0188545 A1* | 7/2014 | Chirica | ............... | G06Q 10/06 |
| | | | | 705/7.27 |
| 2015/0073580 A1* | 3/2015 | Ortiz | ............... | G05B 19/4183 |
| | | | | 700/115 |
| 2015/0363681 A1* | 12/2015 | Simske | ............ | G06K 19/06037 |
| | | | | 235/462.04 |

* cited by examiner

| Timestamp | Station ID | User ID | Item ID |
|---|---|---|---|
| 9:47:12 | S1 | User1 | Item1 |
| 9:49:32 | S1 | User1 | Item2 |
| 9:53:07 | S1 | User1 | Item3 |
| 9:54:58 | S1 | User1 | Item4 |
| 10:01:47 | S5 | User5 | Item1 |
| 10:03:34 | S1 | User1 | Item5 |
| 10:05:16 | S5 | User5 | Item2 |
| 10:08:01 | S1 | User1 | Item6 |
| 10:09:23 | S7 | User7 | |
| 10:12:07 | S5 | User5 | Item3 |
| 10:17:56 | S1 | User1 | Item7 |
| 10:20:21 | S8 | User8 | Item1 |
| 10:22:17 | S7 | User7 | |
| 10:25:36 | S5 | User12 | Item4 |
| 10:27:14 | S1 | User1 | Item8 |
| 10:30:12 | S8 | User8 | Item2 |
| 10:35:49 | S7 | User7 | |
| 10:37:08 | S5 | User12 | Item5 |
| 10:40:12 | S1 | User1 | Item9 |
| 10:42:47 | S10 | User10 | Item1 |
| 10:45:32 | S8 | User8 | Item3 |
| 10:47:13 | S7 | User7 | |
| 10:51:19 | S5 | User12 | Item6 |
| 10:53:02 | S1 | User1 | Item10 |
| 10:55:14 | S11 | User11 | Item1 |
| 10:58:57 | S10 | User10 | Item2 |
| 11:01:32 | S8 | User8 | Item4 |
| 11:03:59 | S7 | User7 | |
| 11:06:01 | S5 | User12 | Item7 |
| 11:09:17 | S1 | User1 | Item11 |

FIG. 7

AUXILIARY DATA MANAGEMENT SYSTEM

CROSS-REFERENCE TO RELATED APPLICATION

This application is a continuation of U.S. patent application Ser. No. 16/247,550 filed on Jan. 14, 2019. The aforementioned application is expressly incorporated herein by reference in its entirety.

BACKGROUND

A barcode is an optical machine-readable representation of information. Devices for identifying or extracting information from barcodes are generally referred to as barcode readers (or barcode scanners).

There are several different types of barcode readers that are commonly used today. For example, one type of barcode reader that is in widespread use is an image-based barcode reader, which includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode. An image-based barcode reader may be a standalone device, or it may be a mobile computing device (e.g., a smartphone or tablet computer) that includes a camera and software for reading barcodes. Some other examples of barcode readers include pen-type scanners, laser scanners, charge-coupled device (CCD) readers, etc.

Barcodes and barcode readers have become widely used in many different types of commercial environments. In addition to being commonly used in point-of-sale stations in retail stores and supermarkets, barcodes and barcode readers are frequently used for many other purposes as well.

For example, some manufacturing processes could benefit from the use of barcodes, including manufacturing processes that involve an assembly line. In a typical assembly line process, an initial component is moved between workstations, and various operations are performed until a finished good is produced. However, there are various problems that may occur during such manufacturing processes. Some of these problems may be related to the machines that are involved in the manufacturing processes (e.g., machines may malfunction). Other problems may be related to workers (e.g., workers that do not properly perform their duties and/or that take unauthorized breaks).

SUMMARY

In accordance with one aspect of the present disclosure, a system may include a plurality of stations that implement a workflow process. The workflow process may include reading a barcode in connection with at least some of the plurality of stations. The barcode may be attached to an item that is moved between the plurality of stations during the workflow process. The system may additionally include a plurality of devices. Each of the plurality of devices may be located at one of the plurality of stations. At least some of the plurality of devices may include barcode reading capability. The system may additionally include process management code stored in memory on at least some of the plurality of devices. The process management code may be executable by one or more processors on the plurality of devices to determine auxiliary data corresponding to the workflow process and send the auxiliary data to a server. The auxiliary data may include metadata that is generated in connection with reading the barcode at the plurality of stations during the workflow process.

In one or more embodiments, the auxiliary data may be sent to a first server. Decoded data may be generated in connection with reading the barcode. The system may additionally include instructions that are executable by the one or more processors to send the decoded data to a second server that is different from the first server.

In one or more embodiments, the metadata may include a plurality of timestamps. Each timestamp may be associated with a station identifier and may indicate a time at which the barcode is read or another type of input is provided at a station corresponding to the station identifier. Each timestamp may additionally be associated with a user identifier.

In one or more embodiments, the plurality of devices may include at least one smart barcode reader that includes the process management code in addition to having barcode reading capability.

In one or more embodiments, the plurality of devices may include a barcode reader that does not include the process management code. The system may additionally include a smart wedge device that is connected to the barcode reader. The smart wedge device may include the process management code.

In one or more embodiments, the plurality of devices may include a mobile device that includes a camera, a barcode reading application stored in the memory of the mobile device, and the process management code stored in the memory of the mobile device.

In one or more embodiments, the plurality of devices may include a non-barcode reading device that includes the process management code but does not have barcode reading capability.

In one or more embodiments, the plurality of stations may be located at a manufacturing facility. Different operations related to assembly of the item may be performed at different stations of the plurality of stations.

In accordance with another aspect of the present disclosure, a method may include reading a barcode at a plurality of stations during a workflow process. The barcode may be attached to an item that is moved between the plurality of stations during the workflow process. The method may additionally include determining auxiliary data corresponding to the workflow process. The auxiliary data may include metadata that is generated in connection with reading the barcode at the plurality of stations during the workflow process. The method may additionally include sending the auxiliary data to a first server and sending decoded data that is generated in connection with reading the barcode to a second server that is different from the first server.

In one or more embodiments, the metadata may include a plurality of timestamps. Each timestamp may be associated with a station identifier and may indicate a time at which the barcode is read or another type of input is provided at a station corresponding to the station identifier. Each timestamp may additionally be associated with a user identifier.

In one or more embodiments, the plurality of stations may be located at a manufacturing facility. Different operations related to assembly of the item may be performed at different stations of the plurality of stations.

In one or more embodiments, a plurality of items may be assembled in accordance with the workflow process. The method may additionally include reading each of a plurality of barcodes at the plurality of stations. Each barcode of the plurality of barcodes may be attached to a different item of the plurality of items.

In one or more embodiments, the method may additionally include receiving a setting at a device that is located at one of the plurality of stations. The setting may define a minimum time period between successive barcode reads. The method may additionally include receiving user input at the device. The user input may include an instruction to read the barcode. The method may additionally include determining an elapsed time period corresponding to an amount of time that has elapsed since the device read a previous barcode and reading the barcode only if the elapsed time period is greater than or equal to the defined minimum time period.

In one or more embodiments, the method may additionally include determining that the elapsed time period is less than the defined minimum time period and displaying a notification message on the device. The notification message may indicate that the barcode is not going to be read.

In one or more embodiments, the method may additionally include determining that the elapsed time period is less than the defined minimum time period and sending a notification message to a different device. The notification message may indicate that an attempt was made to read the barcode when the elapsed time period is less than the defined minimum time period.

In accordance with another aspect of the present disclosure, a method may include receiving auxiliary data corresponding to a workflow process that includes reading a barcode at a plurality of stations. The auxiliary data may be received from a plurality of devices that are located at the plurality of stations and that are used as part of the workflow process. The auxiliary data may include metadata that is generated in connection with reading the barcode. The method may additionally include using the auxiliary data to determine at least one metric related to the workflow process and outputting at least one graphic that includes a visual representation of the at least one metric.

In one or more embodiments, the barcode may be attached to an item that is moved between the plurality of stations during the workflow process. The metadata may include a plurality of timestamps. Each timestamp may be associated with a station identifier and may indicate a time at which the barcode is read or another type of input is provided at a station corresponding to the station identifier. Each timestamp may additionally be associated with a user identifier.

In one or more embodiments, determining the at least one metric may include determining, for each station of the plurality of stations, an average time duration of one or more operations performed at the station.

In one or more embodiments, determining the at least one metric may include determining, for each user of a plurality of users working at a station, an average time duration of a task performed by the user at the station.

In one or more embodiments, determining the at least one metric may include determining a time duration of one or more operations that are performed at a particular station among the plurality of stations. Determining the time duration may include determining a difference between a first timestamp associated with a first barcode read at the particular station and a second timestamp associated with a second barcode read at the particular station.

In one or more embodiments, the at least one graphic may include a bar chart that visually represents an average time between barcode reads at the plurality of stations.

In one or more embodiments, the at least one graphic may include a bar chart that visually represents an average time between barcode reads for a plurality of workers at a particular station.

In one or more embodiments, the at least one graphic may include a line chart that visually represents a time difference between a current barcode read at a particular station and a previous barcode read at that particular station for successive barcode reads.

In one or more embodiments, the method may additionally include receiving user input defining a permitted range for the metric and at least one action to be taken if the metric is outside of the permitted range. The method may additionally include monitoring the metric and taking the at least one action in response to determining that the metric is outside of the permitted range. In one or more embodiments, the at least one action may include deactivating at least one device of the plurality of devices.

In accordance with another aspect of the present disclosure, a wedge device may include one or more processors and memory comprising instructions that are executable by the one or more processors to receive decoded data from a barcode reader that is located at a station among a plurality of stations that implement a workflow process. The decoded data corresponds to a barcode that is read by the barcode reader, and the barcode is attached to an item that is moved between the plurality of stations during the workflow process. The instructions are additionally executable by the one or more processors to determine auxiliary data corresponding to the workflow process. The auxiliary data includes metadata that is generated in connection with reading the barcode. The instructions are additionally executable by the one or more processors to send the auxiliary data to a first server and send the decoded data to a second server that is different from the first server.

In one or more embodiments, the metadata may include a timestamp that indicates a time at which the barcode is read at the station.

In one or more embodiments, the metadata may additionally include a station identifier corresponding to the station. The timestamp may be associated with the station identifier.

In one or more embodiments, the metadata may additionally include a user identifier corresponding to a user that is working at the station when the barcode is read. The timestamp may be associated with the user identifier.

In one or more embodiments, the wedge device may include a first communication interface that is configured to communicate with the barcode reader and a second communication interface that is configured to communicate with the first server and the second server.

In one or more embodiments, the plurality of stations may be located at a manufacturing facility, and different tasks related to assembly of the item may be performed at different stations of the plurality of stations.

In one or more embodiments, a plurality of items may be assembled in accordance with the workflow process. The instructions may be additionally executable by the one or more processors to receive additional decoded data corresponding to a plurality of additional barcodes that are read by the barcode reader. Each barcode of the plurality of additional barcodes may be attached to a different item of the plurality of items.

In one or more embodiments, the instructions may be additionally executable by the one or more processors to determine additional auxiliary data corresponding to the workflow process. The additional auxiliary data may include additional metadata that is generated in connection with reading the plurality of additional barcodes. The instructions may be additionally executable by the one or more processors to send the additional auxiliary data to the first server and send the additional decoded data to the second server.

In one or more embodiments, the additional metadata may include a plurality of sets of metadata. Each set of metadata may correspond to a different item of the plurality of items. A set of metadata corresponding to a particular item having a particular barcode may include a timestamp that indicates a time at which the particular barcode is read at the station during assembly of the particular item.

In one or more embodiments, the set of metadata may additionally include a station identifier corresponding to the station. The timestamp may be associated with the station identifier.

In one or more embodiments, the set of metadata may additionally include a user identifier corresponding to a user that is working at the station when the plurality of additional barcodes are read. The timestamp may be associated with the user identifier.

In accordance with another aspect of the present disclosure, a method may include receiving decoded data from a barcode reader that is located at a station among a plurality of stations that implement a workflow process. The decoded data corresponds to a barcode that is read by the barcode reader. The barcode is attached to an item that is moved between the plurality of stations during the workflow process. The method may additionally include determining auxiliary data corresponding to the workflow process. The auxiliary data may include metadata that is generated in connection with reading the barcode. The method may additionally include sending the auxiliary data to a first server and sending the decoded data to a second server that is different from the first server.

In one or more embodiments, the metadata may include a timestamp that indicates a time at which the barcode is read at the station.

In one or more embodiments, the metadata may additionally include a station identifier corresponding to the station. The timestamp may be associated with the station identifier.

In one or more embodiments, the metadata may additionally include a user identifier corresponding to a user that is working at the station when the barcode is read. The timestamp may be associated with the user identifier.

In one or more embodiments, the plurality of stations may be located at a manufacturing facility, and different tasks related to assembly of the item may be performed at different stations of the plurality of stations.

In one or more embodiments, a plurality of items may be assembled in accordance with the workflow process. The method may additionally include receiving decoded data corresponding to a plurality of additional barcodes that are read by the barcode reader. Each barcode of the plurality of additional barcodes may be attached to a different item of the plurality of items.

In one or more embodiments, the method may additionally include determining additional auxiliary data corresponding to the workflow process. The additional auxiliary data may include additional metadata that is generated in connection with reading the plurality of additional barcodes. The method may additionally include sending the additional auxiliary data to the first server and sending the additional decoded data to the second server.

In one or more embodiments, the additional metadata may include a plurality of sets of metadata. Each set of metadata may correspond to a different item of the plurality of items. A set of metadata corresponding to a particular item having a particular barcode may include a timestamp that indicates a time at which the particular barcode is read at the station during assembly of the particular item.

In one or more embodiments, the set of metadata may additionally include a station identifier corresponding to the station. The timestamp may be associated with the station identifier.

In one or more embodiments, the set of metadata may additionally include a user identifier corresponding to a user that is working at the station when the plurality of additional barcodes are read. The timestamp may be associated with the user identifier.

BRIEF DESCRIPTION OF THE DRAWINGS

FIG. 7 illustrates an example of auxiliary data that may be collected by devices in connection with the assembly of various items.

DETAILED DESCRIPTION

Figure 1:
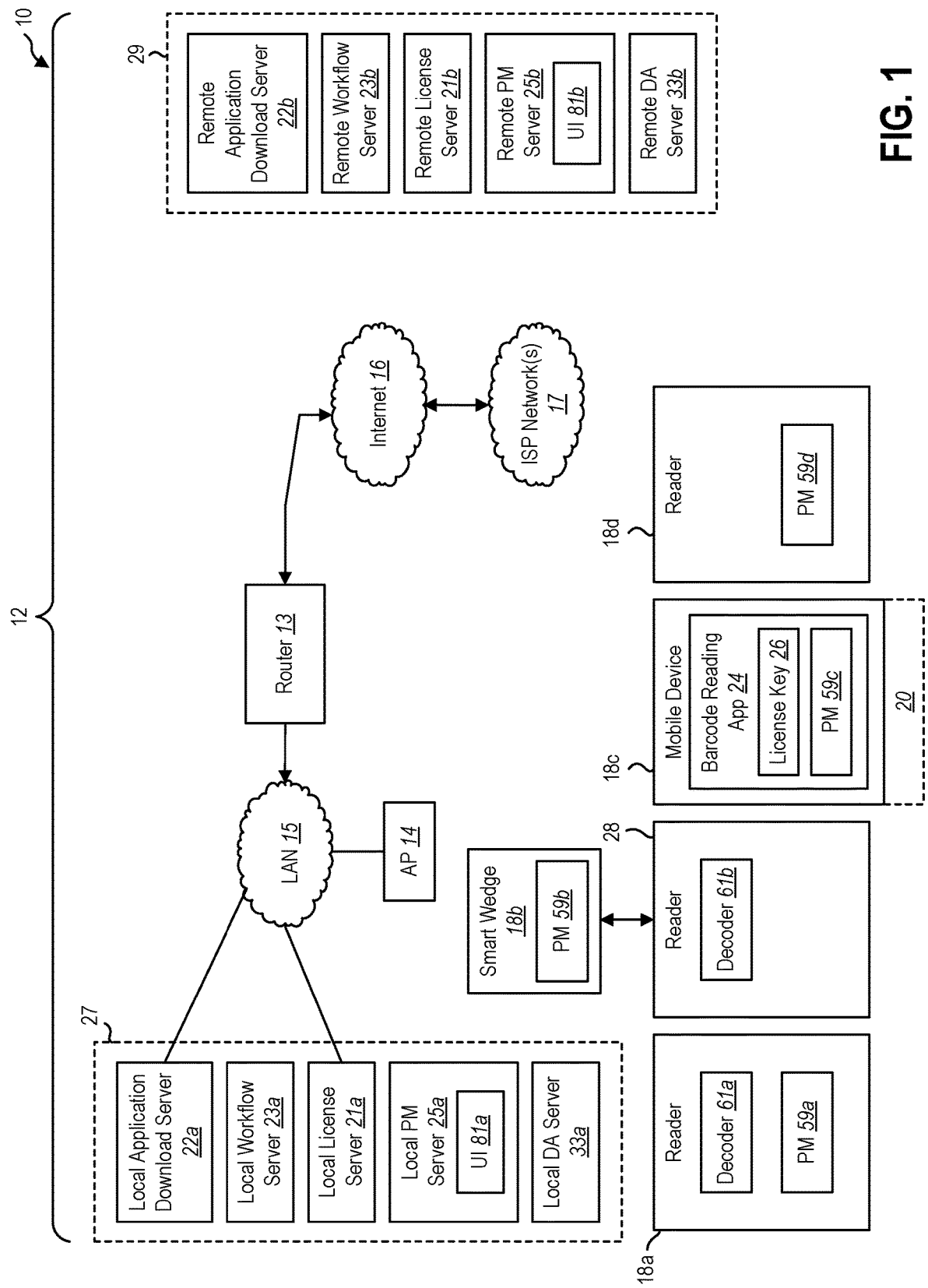
FIG. 1 illustrates the environment of a system according to one embodiment of the present disclosure.

FIG. 1 depicts the environment of a system 10 according to one embodiment of the present application wherein process management input devices 18a-18d, at least some of which may include barcode reading functionality, provide both barcode encoded data to applicable workflow systems 23a-23b (traditional use of data encoded within and read from barcodes by barcode readers); and ii) in conjunction with reading barcode data to support the workflow systems 23a-23b, generate auxiliary data during the process of reading the barcodes for auxiliary process management systems 25a-25b and/or aggregation systems 33a-33b.

The system 10 may include one or more workflow servers 23, including a local workflow server 23a and a remote workflow server 23b. In general, the workflow servers 23a-23b use the data encoded within the barcode to track, manage, document a workflow process.

In one embodiment, the work flow servers 23a-23b may support a retail sales work flow wherein a barcode reader attached to a POS system may be used to identify articles being purchased (e.g. read a UPC barcode). The data within the barcode is used to identify the product and the workflow server, upon receiving the product ID may look up the product price for the POS system to complete the sale. The work flow servers may be used to track inventory of the products, automate ordering of new products, etc.

In one embodiment, the work flow servers 23a-23b may be part of a hospital or other healthcare provider's electronic health record system. Data within barcode on equipment, consumables, medications, and patient wristbands may be used to record medical operations such as disbursement of medications and use of equipment and/or consumables within the electronic health record systems.

In one embodiment, the work flow servers 23a-23b may be part of a manufacturer's assembly line. Data within barcodes on components may be read and used to identify components (by part number common across all components or by serial number identifying each component individually), track inventory, associate components with final assemblies etc.

In one embodiment, the work flow servers 23a-23b may be part of a provider's systems for verifying age of purchasers of age restricted items such as alcohol or tobacco products. A barcode on an individual's ID card may be read for verification of the individual's age and the work flow servers 23a-23b may retain certain identification information for the duration of time proscribed by applicable law.

The process management servers 25a-25b may use: i) certain portions of the data encoded in, and read from, the barcodes; and/or ii) auxiliary data generated during the process of reading the barcodes to evaluate and improve efficiency of the work flow.

The data aggregation servers 33a-33b may use: i) certain portions of the data encoded in, and read from, the barcodes; and/or ii) auxiliary data generated during the process of reading the barcodes to aggregate non-personally identifiable statistical data regarding the work flow or multiple workflows.

In one embodiment, the process management servers 23a-23b and/or data aggregation servers 25a-25b may obtain information about the quality of each barcode being read (print quality). As such as quality information may be aggregated and statistics calculated, it may become apparent that certain products may have better printed barcodes than other products or that quality of printing is deteriorating over time on a certain barcode.

In a related embodiment, the process management servers and/or data aggregation servers may obtain information about the quality each barcode being read by multiple barcode readers. As such quality information is being aggregated and statistics calculated, it may become apparent that certain barcodes appear to be of better quality in one reader over the another reader so that it can be concluded that one reader is capturing clearer images. The reader that is capturing the less clear images may be checked for damage such as a scratched or dirty imaging window.

In one embodiment, the process management servers may track the location of each replaceable battery back used on barcode readers or other data capture devices as part of the work flow. The age and diminished health (diminished charge capacity) may be tracked.

In one embodiment, the process management servers and/or data aggregation servers may track metadata associated with each barcode read and the data analyzed and used for measuring efficiency of the workflow and/or equipment or individuals participating in the work flow. Metadata may include location of the barcode read, the user of the barcode reader, a timestamp of the barcode read etc.

The system 10 includes a network 12 via with barcode data and the auxiliary data are provided from the process management input devices 18a-18d to the applicable workflow servers 23a-23b, process management servers 25a-25b, and data aggregation servers 33a-33b.

The network 12 may be expansive including one or more local area networks (LAN) 15, the internet 16, and one or more wired or wireless internet service provider networks 17.

Each local area network 15 may use any known network technologies such as Ethernet and TCP/IP protocols to interconnect various systems. Each LAN 15 may further include at least one wireless access point 14 enabling wireless LAN communications with various systems utilizing known technologies such as Wi-Fi™ (IEEE 802.11).

The LAN 15 may be coupled to the Internet 16 via a router 13. Although FIG. 1 depicts the LAN 15 coupled to the Internet 16 via a single router 13, such connections may employ multiple routers and firewall systems, including demilitarized zone (DMZ) networks.

For purposes of illustration, the systems interconnected by the LAN 15 may include the local workflow server 23a, local process management server 25a, a local data aggregation server 33a and various process management input devices 18a-18d.

Coupling the LAN 15 to the internet 16 enables the system 10 to include and interconnect remote work flow server(s) 23b, remote process management server(s) 25b, remote data aggregation server(s) 33b, and various other process management input devices 18a-18d via one or more wired or wireless internet service provider networks 17.

The remote devices (e.g., devices coupled to the Internet 16) may be logically connected to the LAN 15 using Virtual Private Network (VPN) technology. As such, a mobile device, 18d for example, coupled to communicate with the wireless ISP network 17 utilizing WAN communications may, utilizing a VPN technology, be an endpoint on the LAN 15.

The process management input devices 18a-18d may include combinations of smart barcode readers 18a, smart wedges 18b, mobile devices 18c, and non-barcode reading process data input devices 18d. Each of the process management input devices 18a-18d may be configured to perform one or more process management operations. The process management operations may include determining auxiliary data corresponding to a workflow process. The auxiliary data may include metadata that is generated in connection with reading one or more barcodes during the workflow process. The process management operations may also include sending the auxiliary data to one or more servers, such as the process management servers 25a-25b and/or the data aggregation servers 33a-33b. To enable the process management input devices 18a-18d to perform process management operations, each of the process management input devices 18a-18d may include code (which may be referred to herein as process management code) that is stored in memory and executable by one or more processors to perform process management operations.

In general, a smart barcode reader 18a may be configured to perform process management operations in addition to having barcode reading capability. In other words, in addition to reading barcodes and outputting decoded data for the workflow servers 23a-23b, a smart barcode reader 18a may also be configured to generate auxiliary data for use by the process management servers 25a-25b and/or data aggregation servers 33a-33b. In addition to a decoder 61a, the smart barcode reader 18a is also shown with process management code 59a that enables the smart barcode reader 18a to perform process management operations.

In general, a smart wedge device 18b is configured to be connected to a traditional barcode reader 28 that is not capable of performing process management operations. The smart wedge device 18b may be configured to perform one or more process management operations related to the barcode reading operations that are performed by the barcode reader 28. For example, a smart wedge device 18b may be configured to: i) couple to, and receive decoded barcode data from, a traditional barcode reader 28; ii) forward the decoded data to the applicable work flow server 23; iii) generate auxiliary data in relation to the forwarded decoded data; and iv) provide a combination of portions of the decoded data and/or the auxiliary data to one or more of the process management servers 25a-25b and/or data aggregation servers 33a-33b. In FIG. 1, the traditional barcode reader 28 is shown with a decoder 61b, and the smart wedge device 18b is shown with process management code 59b.

The term "mobile device," as the term is used in this patent specification and the accompanying claims, will be used to describe a portable, hand-held computing device that comprises a camera. One example of a mobile device is a smartphone. Another example of a mobile device is a tablet computer. Yet another example is a hybrid tablet/smartphone device, often nicknamed a "phablet."

A mobile device 18c may include a barcode reading application 24 that enables the mobile device 18c to perform barcode reading operations. For example, the barcode reading application 24 may utilize a camera of the mobile device 18c to capture an image of a barcode. The barcode reading application 24 may also include a decoder that processes the captured image in order to decode the barcode. In addition to performing barcode reading operations, the barcode reading application 24 may also be configured to perform one or more process management operations. FIG. 1 shows the barcode reading application 24 with process management code 59c for providing this functionality. In operation, the barcode reading application 24 may utilize a camera of the mobile device 18c to read barcodes; ii) provide the decoded data to the applicable work flow server 23; iii) generate auxiliary data in relation to the barcode read and/or in relation to the decoded data; and iv) provide a combination of portions of the decoded data and/or the auxiliary data to one or more of the process management servers 25a-b and/or data aggregation servers 33a-33b. The auxiliary data generated by a non-barcode reading process management input device 18d may: i) relate to the work flow in which other process management input devices 18a-18c provide decoded barcode data as part of the work flow; and/or ii) relate to the barcode data read by the other process management input devices 18a-18c as part of the work flow.

In general, a non-barcode reading process management input device 18d does not have barcode reading capability but is capable of performing process management operations. For example, the non-barcode reading process management input device 18d may be configured to generate auxiliary data in relation to the workflow and provide the auxiliary data to one or more of the process management servers 25a-25b and/or data aggregation servers 33a-33b.

Figure 2:
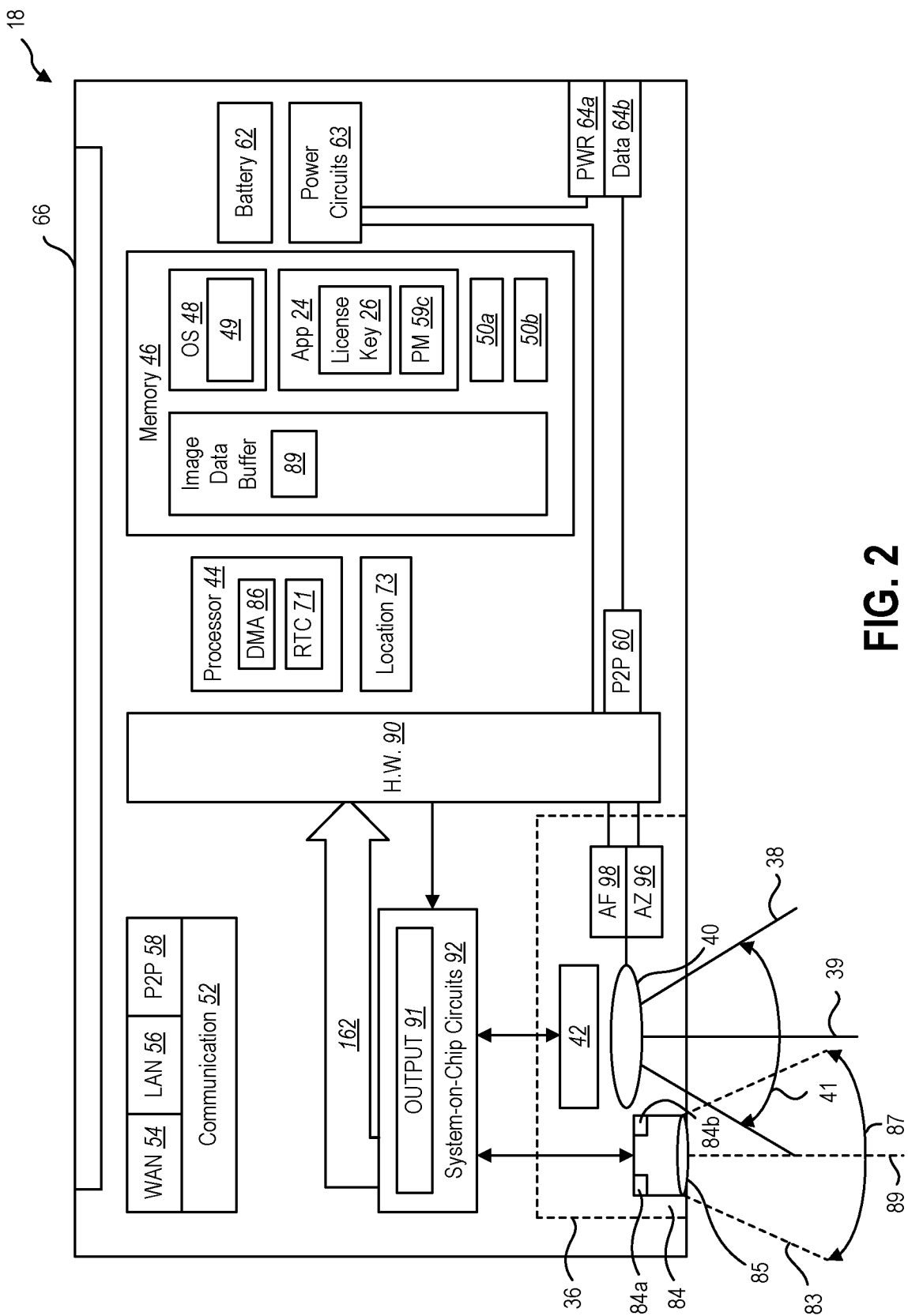
FIG. 2 illustrates an embodiment of a mobile device that may be used in the system shown in FIG. 1.

Referring to FIG. 2 in conjunction with FIG. 1, each mobile device 18c may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of a LAN 15, such that the mobile device itself may be an addressable endpoint on the LAN 15, i.e., the mobile device may be assigned an IP address and may be capable of IP communications with other devices over the LAN 15 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

The mobile device 18c may include a processor 44 and memory 46 in electronic communication with the processor 44. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, a barcode-reading application 24 (which may include a process management module 59 and a license key 26), one or more other applications 50a, 50b, and a data buffer including an image data buffer 89.

In operation, the processor 44 may execute instructions embodied in the operating system 48, the barcode-reading application 24, and each of the other applications 50a, 50b. The processor 44 may further include a real time clock 71 to enable the mobile device to determine the time at which a barcode is read.

Hardware circuits 90 interface the processor 44 with peripheral systems including, but not limited to, a (multi-touch) display screen 66, a wireless communication system 52, a hardwired point-to-point communication interface 60, a camera assembly 36, and other peripheral systems, including auxiliary data input systems such as a GPS location system 73 or other system for determining the location of the mobile device 18c.

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector such as a USB connector or an Apple® Lightning Connector®).

The camera assembly 36 may include a (color) photo sensor 42 (i.e., an array of image sensors). The photo sensor 42 may be positioned parallel to each of the face surface and the back surface of the mobile device 18. The camera assembly 36 may also include a lens assembly 40 with an optical axis 39 orthogonal to the photo sensor 42 and defining a center line of a camera field of view 38 extending outward from the back surface of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip control circuits 92. In one embodiment, the control circuits 92 may control the operation of the photo sensor 42 (e.g., exposure, gain, and coupling of pixels to analog-to-digital (A/D) converters for image read out), format the digital intensity values of each pixel of the photo sensor 42 for color image output, and make the color image output available for writing to the image data buffer 89.

In another embodiment, the control circuits 92 may include output module 91 which may perform image processing on images captured by the photo sensor 42. Control of the photo sensor 42 and image pre-processing which may be performed by the system on chip circuits 92 are described in more detail in U.S. patent application Ser. No. 14/717,112, entitled "BARCODE READER" and filed on May 20, 2015, which is hereby incorporated by reference in its entirety (Reference 3271-2-071) (the "112 application"). As such, the digital image output 162 (which may be the color image or a result of processing the image one or more times in accordance with the teachings of U.S. patent application Ser. No. 14/717,112) may be written to the image data buffer 89. The mobile device 18 may include a direct memory access (DMA) system 86 which may be a part of the processor 44. The DMA system 86 provides for direct writing of the digital image output 162 from the camera assembly 36 to the image data buffer 89.

The camera assembly 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500° K representing a warm color "white," such as that of candlelight, and 9500° K representing a cool color "white," such as that of a blue sky. The exemplary white LED may be within this range. Alternatively, the exemplary white LED may have a color between 4000° K and 7000° K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface and having an illumination axis perpendicular to the back surface and an illumination angle 87 which substantially coincides with the field of view 38 of the camera assembly 36. In operation, the system-on-chip circuits 92 may control each LED 84a, 84b independently; and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

The mobile device 18c may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Figure 3:
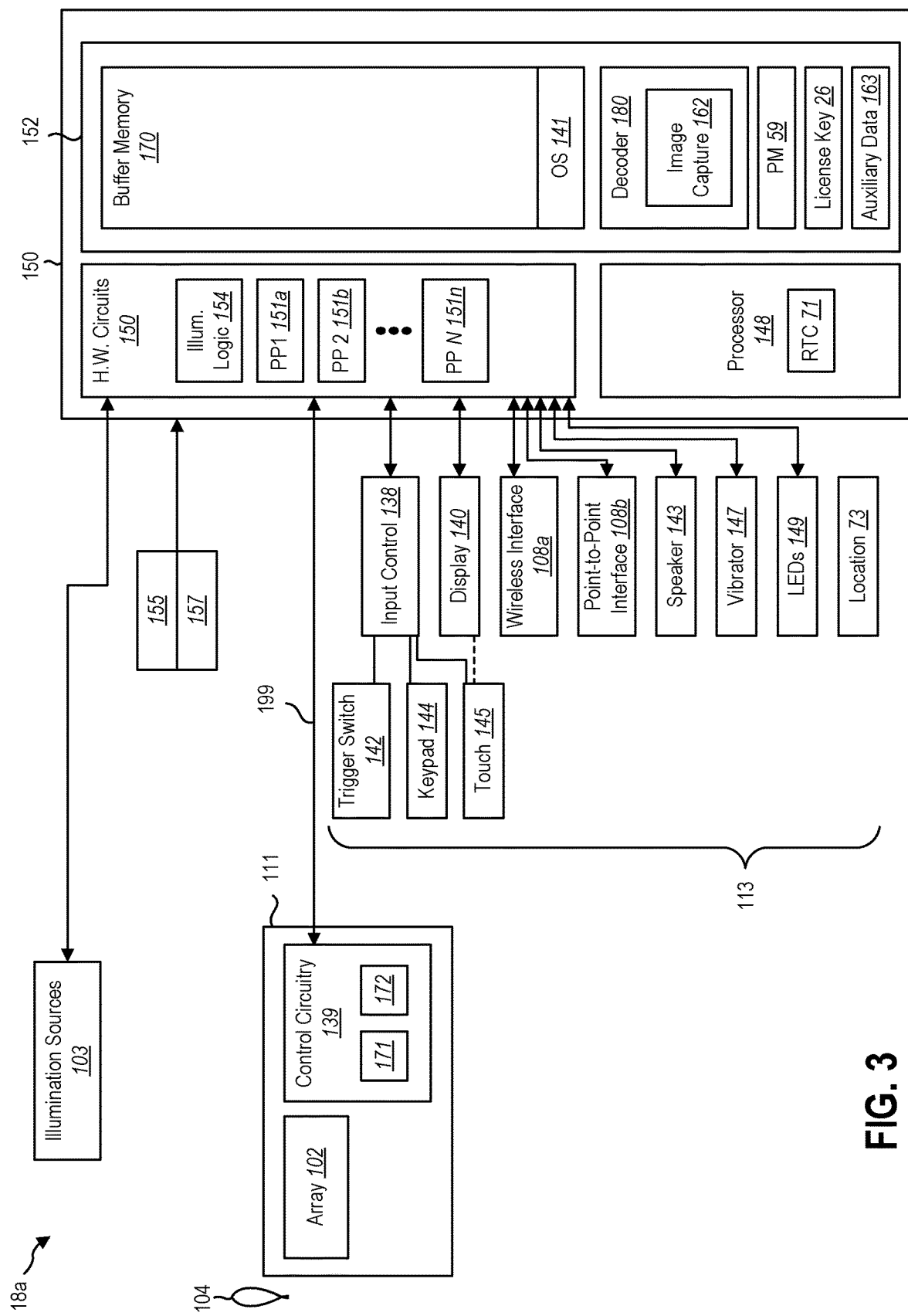
FIG. 3 illustrates an embodiment of a smart barcode reader that may be used in the system shown in FIG. 1.

Referring to FIG. 3 in conjunction with FIG. 1, each smart barcode reader 18*a* may include an image capture control and decode system 150, an image sensor system package 111, and an illumination system including illumination logic 154 and one or more illumination sources 103, and various input/output (I/O) peripheral systems 113.

The image sensor system package 111 and the image capture control and decode system 107 may be included in two separate packages, each of which may include one or more silicon dies that may include: i) a processor; ii) hardware circuits including digital signal processing and/or gate logic; and iii) memory. The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The illumination system may include one or more illumination sources 103 and illumination logic 154. The illumination sources 103 may be, for example, light-emitting diodes (LEDs). The illumination logic 154 may be configured to activate one or more of the illumination sources 103 to emit illumination into a target area.

The I/O peripheral systems 113 may include a user interface comprising input control 138 and/or a display 140. The input control 138 may include a trigger switch 142, a keypad 144, and/or a touch panel 145, such as a touch screen over the display 140. In addition, the smart barcode reader 18*a* may have one or more output devices that convey information to a user. Such output devices may include the touch panel 145, which may be a touch screen, a speaker 143, a vibrator 147, and/or one or more components that illuminate in a manner visible to a user, such as one or more light-emitting diodes (LEDs) 149.

The I/O peripheral systems 113 may further include one or more communication interfaces 108. The communication interfaces 108 may include: i) a wireless interface 108*a* which may be a wireless local area network (LAN) interface or a wide area network (WAN) interface; and ii) a point-to-point interface 108*b* which may be a wireless point-to-point interface and/or a hardwired point-to-point interface.

The LAN interface may utilize Wi-Fi™ (IEEE 802.11) or similar wireless local area communication protocols for communication with a wireless access point 14 of a wireless portion of a LAN 15, such that the smart barcode reader 18*a* itself may be an addressable endpoint on the LAN 15, i.e., the smart barcode reader 18*a* may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart barcode reader 18*a* such that the smart barcode reader 18*a* may be capable of IP communications with other devices over the wireless ISP network 17 using IP protocols such as TCP, UDP, or the like.

The wireless point-to-point interface(s) 108*b* may be, for example, a Bluetooth® interface to enable the smart barcode reader 18*a* to establish a wireless point-to-point communication link with, and communicate over the wireless communication link with, a host device (i.e., a host computer).

The hardwired point-to-point interface(s) 108*b* may comprise a Universal Asynchronous Receiver/Transmitter (UART) or a Universal Serial Bus (USB). In one or more embodiments, the barcode reader may utilize the point-to-point interface(s) 108*b* to establish a point-to-point connection with a host device using a multi-conductor data interface.

The image capture control and decode system 107 may include: i) a processor 148; ii) a memory 152; and iii) hardware circuits 150 for coupling to, and driving operation of, each of the illumination sources 103, the I/O peripheral systems 113, and the image sensor system package 111.

The processor 148, as described, may be a general-purpose single or multi-die microprocessor (e.g., an ARM), a special purpose microprocessor (e.g., a digital signal processor (DSP)), a microcontroller, a programmable gate array, etc. The processor 148 may be referred to as a central processing unit (CPU). Although just a single processor 148 is shown in FIG. 1, in an alternative configuration, a combination of processors (e.g., an ARM and DSP) may be used.

The processor 148 may further include a real time clock 71 to enable smart barcode reader 18*a* to determine the time at which a barcode is read.

The I/O peripheral systems 114 may further include auxiliary data input systems such as a GPS location system 73 or other system for determining the location of the reader 18*a*.

The hardware circuits 150 may provide an interface between the image capture control and decode system 107 and each of the illumination sources 103, the I/O peripheral systems 113, and the image sensor system package 111. The hardware circuits 150 may further include illumination logic 154 and pre-processing circuits 151*a-n*, each of which will be described in more detail herein.

The memory 152, as described, may be any combination of non-volatile memory or storage and volatile memory or storage. The memory 152 may include a buffer memory 170 (e.g., an image buffer), a decoder 180, and an image capture module 162. These components may be stored in any combination of volatile and non-volatile memory. Some modules may be stored in both volatile and non-volatile memory, for example, with permanent storage of the module in non-volatile memory and a temporary copy stored in volatile memory for execution by the processor 148. In addition to, or as an alternative to, these modules, the memory 152 may store any number of other modules including but not limited to those set forth in the patent applications incorporated by reference in this disclosure. Additional detail with regard to one or more components of the image capture control and decode system 107 is included below.

As mentioned in some detail above, and as shown in FIG. 1, the smart barcode reader 18a additionally includes the image sensor system package 111, which may include: i) a two-dimensional photo sensor array 102 onto which illumination from the field of view of the barcode reader 100 is focused by an optic system 104 (e.g., one or more lenses for focusing an image of a barcode); ii) hardware gate logic 141 implementing one or more pre-processing circuits 165a-n; iii) volatile memory or storage such as random access memory implementing an image buffer 163; iv) hardware gate logic implementing bus logic 155 for transferring each image frame captured by the photo sensor array 102 to the hardware gate logic 141 (or the image buffer 163); and v) control circuitry 139. The control circuitry 139 may include a combination of gate logic, volatile memory or storage, and a processor executing code stored in the memory implementing control of the photo sensor array 102 (image read-out), the bus logic 155, the hardware gate logic 141, and the image buffer 163. The control circuitry 139 can transfer image data records to the image capture control and decode system 107. The control circuitry 139 may include exposure circuitry 171 that defines an exposure period for the photo sensor array 102. The control circuitry 139 may also include readout circuitry 172 that is configured to read out image data from the photo sensor array 102. The control circuitry 139, control of the photo sensor 102 and image pre-processing which may be performed as described in more detail in U.S. patent application Ser. No. 14/717,112, entitled "BARCODE READER" and filed on May 20, 2015, which is hereby incorporated by reference in its entirety (Reference 3271-2-071) (the "112 application").

As mentioned above, the hardware circuits 150 include illumination logic 154 for controlling illumination provided by the illumination sources 103. The illumination logic 154 may control the illumination sources 103 to illuminate a field of view of the barcode reader 100. Advantageously, control of the illumination sources 103 may occur without the use of any signals from the image sensor system package 111. For example, the illumination logic 154 may control the illumination sources 103 without receiving or otherwise depending on any signals from the photo sensor array 102 or any other components of the image sensor system package 111.

In one or more embodiments, the decoder 180 and/or the image capture module 162 may provide illumination parameters to the illumination logic 154. The illumination parameters control the illumination settings to be used for capture of an image frame. More specifically, the illumination parameters may define such illumination settings as: i) identifying one or more illuminators to activate over a duration of time; and ii) the intensity of illumination to be generated by one or more of the illuminators to be activated. In certain exemplary embodiments the intensity may be defined as: i) a percentage from zero percent (0%) to one hundred percent (100%) representing the percent of a maximum illumination intensity that can be generated by the illumination sources 103; ii) pulse-width-modulation (PWM) parameters representing a percentage of a pulse cycle for which maximum operating power is applied to the illumination sources 103 in a pulsing pattern; and iii) a percentage greater than one hundred percent (100%) representing a power level to be applied if the illumination sources 103 are to be over-driven.

In certain embodiments, the illumination parameters may be provided to the illumination logic 154 for one or more image frames within a burst of image frames to be captured by the photo sensor array 102 by the image capture module 162 writing the illumination parameters for each frame to a distinct register within the illumination logic 154.

In the barcode reader 100 depicted in FIG. 1, the hardware circuits 150 include a number of pre-processing circuits 151a-n, which may be implemented within the gate logic of the hardware circuits 150. The pre-processing circuits 151a-n may perform operations such as convolution, binning, sub-sampling and other image processing functions on image data provided by the image sensor system package 111 via the bus 199, as described in the 112 Specification. The pre-processing circuits 151a-n may perform operations as described in the 112 Specification and write one or more image data records 153a-n to the buffer memory The image capture control and decode system 107 may include a decoder 180. The decoder 180 may be configured to (i) determine which of the one or more image data records 167a-n (or windows within one or more image data records 167a-n) may be transferred from the image buffer 163 to the image capture control and decode system 107; ii) determine a permutation of one or more pre-processing functions (performed by pre-processing circuits 151a-n) to apply to each of the image data records 167a-n (or windows within one or more image data records 167a-n) to generate, and write to the buffer memory 170, image data records 153a-n, each of which may also be a derivative of the one or more image frames (whether full, binned, or sub-sampled) captured by the photo sensor array 102; iii) determine a permutation of one or more pre-processing functions to apply to each of the image data records 153a-n (or windows within one or more image data records 153a-n) to generate, and write to the buffer memory 170, additional (or replacement) image data records 153a-n, each of which may also be a derivative of the one or more image frames (full, binned, sub-sampled, and/or cropped) captured by the photo sensor array 102; and iv) decode the barcode present within the field of view of the barcode reader 100 and imaged within the one or more image frames (whether full, binned, or sub-sampled) captured by the photo sensor array 102 and represented by at least a portion of one of the image data records 153a-n derived from such image frame.

The smart barcode reader may include a processor 148 may be embodied as a combination of one or more microprocessors, microcontrollers, digital signal processors (DSP), or the like, and, when operating, may execute instructions (in the form of an operating system and/or applications) stored in the memory 152. The memory 152 may be any component capable of storing electronic information, including an operating system and/or application instructions executable by the processor 148, and may be embodied as read-only memory (ROM), random access memory (RAM), magnetic disk storage media, optical storage media, flash memory devices, on-board memory included with the processor 148, erasable programmable read-only memory (EPROM), electrically erasable programmable read-only memory (EEPROM), and/or registers, etc.

The memory 152 may include an embedded operating system, a barcode-reading application comprising the image capture module 162 and the decoder 180, and a license key 26.

In operation, the processor 148 may execute instructions embodied in the embedded operating system, the image capture module 162 and the decoder 180.

The smart barcode reader 18*a* may further include a battery 155 and power circuits 157. In general the power circuits 157 control charging of the battery 1552 from power received from an external power source (not shown) and providing operating power at the voltage and current drawing requirements of the various components of the smart barcode reader 18*a* from the power received from the battery 155 or the external power source (when connected to the external power source).

Referring to FIG. 3 in conjunction with FIG. 1, in an exemplary embodiment, the operating system 141 may include an upgrade system 49 which obtains upgrades and newer versions of any of the decoder 180 and auxiliary data system 163 from and application download server 22*a* or 22*b* as descried later herein.

Figure 4A:
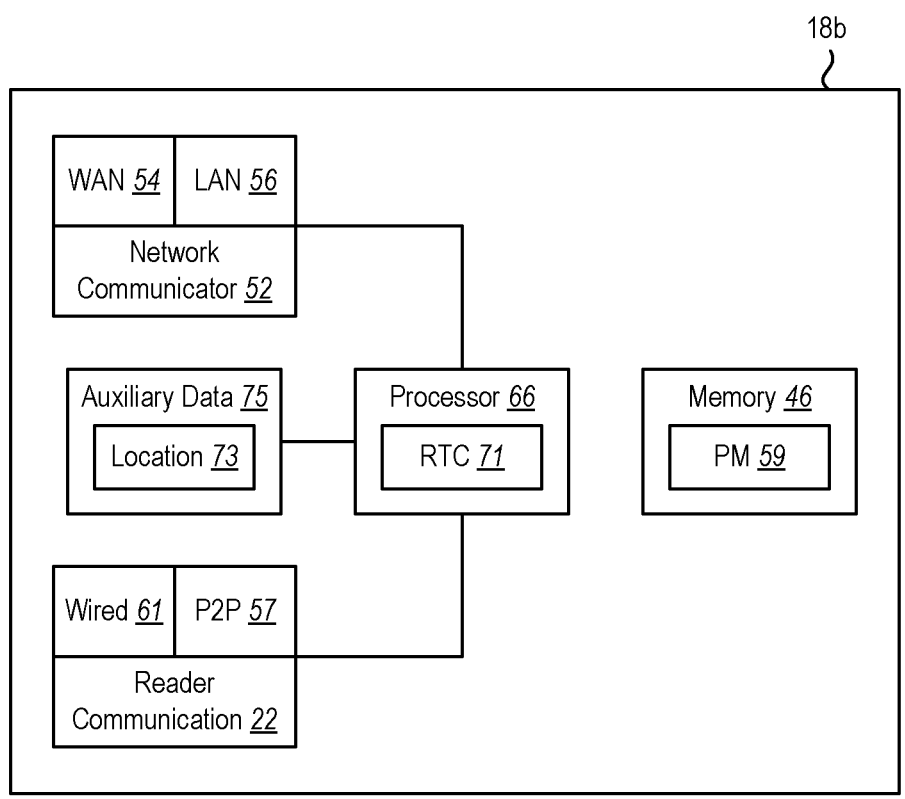
FIG. 4A illustrates an embodiment of a smart wedge device that may be used in the system shown in FIG. 1.

Referring to FIG. 4*a* in conjunction with FIG. 1, the smart wedge 18*b*: i) couples to, and receives decoded barcode data from, a traditional barcode reader 28; ii) forwards the decoded data to the applicable work flow server 23*a*-23*b*; iii) generates auxiliary data in relation to the forwarded decoded data; and iv) provides a combination of portions of the decoded data and/or the auxiliary data to one or more of the process management servers 25*a*-25*b* and/or data aggregation servers 33*a*-33*b*.

The smart wedge 18*b* may include: i) a processor 66; ii) memory including an embedded operating system; and iii) hardware circuits 75 including a GPS location system 73 or other system for determining the location of the smart wedge 18*b*.

The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The smart wedge 18*b* may further include one or more network communication interfaces 52. The network communication interfaces 52 may include: i) a wireless local area network (LAN) interface 54 and/or a wide area network (WAN) interface 56 which function as previously described and enable the smart wedge 18*b* to be an addressable endpoint on the LAN 15 (directly or via VPN) and provide decoded data from the traditional barcode reader 28 to the applicable workflow servers 23*a*-23*b* and provide permutations of at least part of the decoded data and auxiliary data to the process management servers 25*a*-25*b* and/or the data aggregation servers 33*a*-33*b*.

The smart wedge 18*b* may further include reader communication systems 77 for receiving decoded data from the traditional barcode reader 28. The reader communication systems 77 may include a point-to-point interface which may be a wireless point-to-point interface 57 and/or a hardwired point-to-point interface 61.

The LAN interface 56 may utilize Wi-Fi™ (IEEE 802.11) or similar wireless local area communication protocols for communication with a wireless access point 14 of a wireless portion of a LAN 15, such that the smart wedge 18*b* itself may be an addressable endpoint on the LAN 15, i.e., the smart wedge 18*b* may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart wedge 18*b* such that the smart wedge 18*b* may be capable of IP communications with other devices over the wireless ISP network 17 using IP protocols such as TCP, UDP, or the like.

The wireless point-to-point interface(s) 57 may be, for example, a Bluetooth® interface to enable the smart wedge 18*b* to establish a wireless point-to-point communication link with, and communicate over the wireless communication link with, a the traditional barcode reader 28 to receive decoded data therefrom.

The hardwired point-to-point interface(s) 61 may comprise a Universal Asynchronous Receiver/Transmitter (UART) or a Universal Serial Bus (USB). In one or more embodiments, the barcode reader may utilize the point-to-point interface(s) 61 to establish a point-to-point connection with the traditional barcode reader 18 to receive decoded data therefrom.

The processor 66 may further include a real time clock 71 to enable smart wedge 18*b* to determine the time at which a barcode is read.

The auxiliary data systems 75 may include systems such as a GPS location system 73 or other system for determining the location of the smart wedge 18*b*.

The memory 152 may include an embedded operating system, a the process management code 59 and a license key 26 setting forth the licenses functions of the process management code 59.

In operation, the processor 148 may execute instructions embodied in the embedded operating system and the process management code 59 to obtain decoded data from the traditional barcode reader 28, determine and associate auxiliary data with the decoded data; and transmit permutations of the decoded data and the auxiliary data to the work flow servers 23*a*-23*b*, process management server 25*a*-25*b* and data aggregation servers 33*a*-33*b*.

Figure 4B:
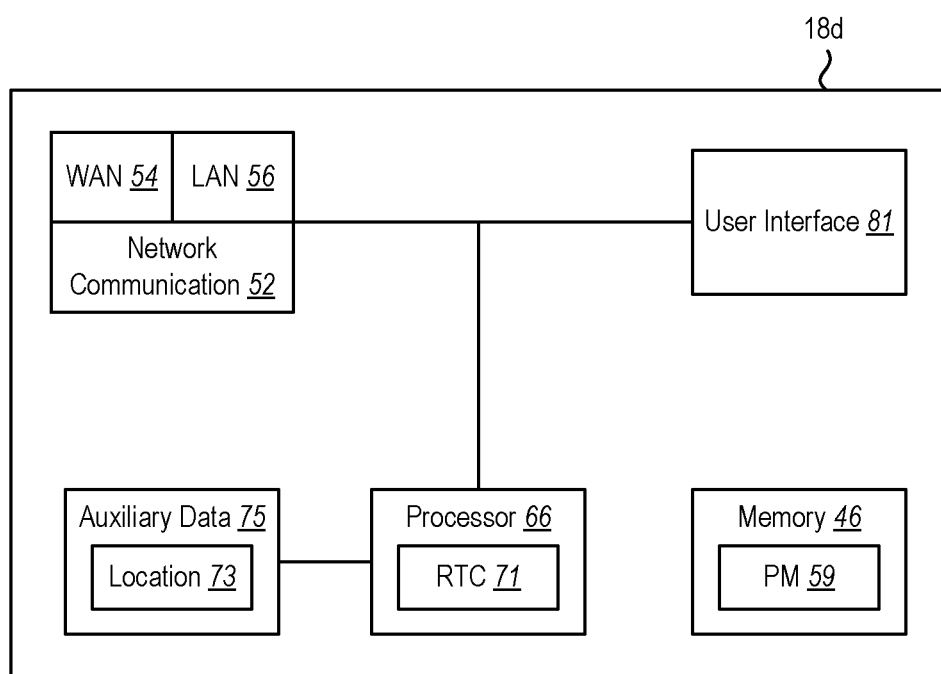
FIG. 4B illustrates an embodiment of a non-barcode reading process management device that may be used in the system shown in FIG. 1.

Referring to FIG. 4*b* in conjunction with FIG. 1, the non-barcode reading process management device 18*d*: i) generates auxiliary data in relation to the work flow supported by other process management devices 18*a*-18*c* and/or the barcode data captured by the other process management devices 18*a*-18*c* within the system 10; and ii) provides the auxiliary data to one or more of the process management servers 25*a*-25*b* and/or data aggregation servers 33*a*-33*b*.

The device 18*d* may include: i) a processor 66; ii) memory including an embedded operating system; and iii) hardware circuits 75 including a GPS location system 73 or other system for determining the location of the smart wedge 18*b*.

The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The device 18d may further include one or more network communication interfaces 52. The network communication interfaces 52 may include: i) a wireless local area network (LAN) interface 54 and/or a wide area network (WAN) interface 56 which function as previously described and enable the device 18d to be an addressable endpoint on the LAN 15 (directly or via VPN) and provide decoded data from the traditional barcode reader 28 to the applicable workflow servers 23a-23b and provide permutations of at least part of the decoded data and auxiliary data to the process management servers 25a-25b and/or the data aggregation servers 33a-33b.

The LAN interface 56 may utilize Wi-Fi™ (IEEE 802.11) or similar wireless local area communication protocols for communication with a wireless access point 14 of a wireless portion of a LAN 15, such that the device 18d itself may be an addressable endpoint on the LAN 15, i.e., the device 18d may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart wedge 18b such that the smart wedge 18b may be capable of IP communications with other devices over the wireless ISP network 17 using IP protocols such as TCP, UDP, or the like.

The processor 66 may further include a real time clock 71 to enable device 18d to determine the time at which it is activated to generate auxiliary data. The auxiliary data systems 75 may include systems such as a GPS location system 73 or other system for determining the location of the device 18d.

The memory 152 may include an embedded operating system, the process management code 59 and a license key 26 setting forth the licenses functions of the process management code 59.

In operation, the processor 66 may execute instructions embodied in the embedded operating system and the process management code 59 to obtain decoded data from the traditional barcode reader 28, determine and associate auxiliary data with the decoded data; and transmit permutations of the decoded data and the auxiliary data to the work flow servers 23a-23b, process management server 25a-25b and data aggregation servers 33a-33b.

Returning to FIG. 1, the system 10 may include one or more local application download servers 22a-22b which make the barcode reading application 24 (and other applications 50a-50b) available to the mobile device 18c as well as making updates and/or upgrades to the process management code 59 available to any of the smart barcode reader 18a, smart wedge 18b, and non-barcode reading device 18d.

The system 10 may further include one or more license servers 21a-21b which may: i) make licensing entitlements (e.g., a license key 26) necessary for the operation of at least one function of the at least one decoder of the barcode-reading application 24 available to the mobile device 18c and the decoder of the smart barcode reader 18a; and ii) make licensing entitlements (e.g., a license key 26) necessary for operation of at least one function of the process management system 59 of the barcode reading application 24 to the mobile device 18c, the smart wedge 18b, and the non-barcode reading device 18d.

The application download server may be, for example, a local application download server 22a or a remote application download server 22b. Similarly, the license server may be a local license server 21a or a remote license server 21b. The application download server and the license server may operate on distinct hardware or may operate on the same hardware server. For example, the local application download server 22a and the local license server 21a may operate on the same hardware server 27 or on distinct hardware servers, each coupled to a local area network (LAN) 12. Similarly, the remote application download server 22b and the remote license server 21b may operate on the same hardware server 29 or on distinct hardware servers, each coupled to the Internet 16.

Referring to FIG. 2 in conjunction with FIG. 1, in an exemplary embodiment, the operating system 48 may include an application retrieval system 49 which obtains the barcode-reading application 24 (and the applications 50a, 50b) from and application download server 22a or 22b. In one embodiment, the operation of the application retrieval system 49, which may obtain the barcode-reading application 24 and the other applications 50a, 50b from the application download server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application download server 22a or 22b.

In general, retrieval of the barcode reading application 24 and the licensing entitlement (e.g. license key 26) for barcode reading and ensuring the barcode data is routed to the applicable workflow servers 23a-23b is as described in more detail in U.S. patent application Ser. No. 16/112,413, entitled "ENTERPRISE-LEVEL LICENSING FOR A BARCODE DECODER WITHIN A MOBILE DEVICE APPLICATION" and filed on Aug. 24, 2018, which is hereby incorporated by reference in its entirety (Reference 3271-2-116) (the "413 application").

Similarly, retrieval of the licensing entitlement (e.g. license key 26) for the process management module in any of the devices 18a-18d may be performed as described with respect to retrieval of the license key 26 by a mobile device in the incorporated specification.

Figure 5:
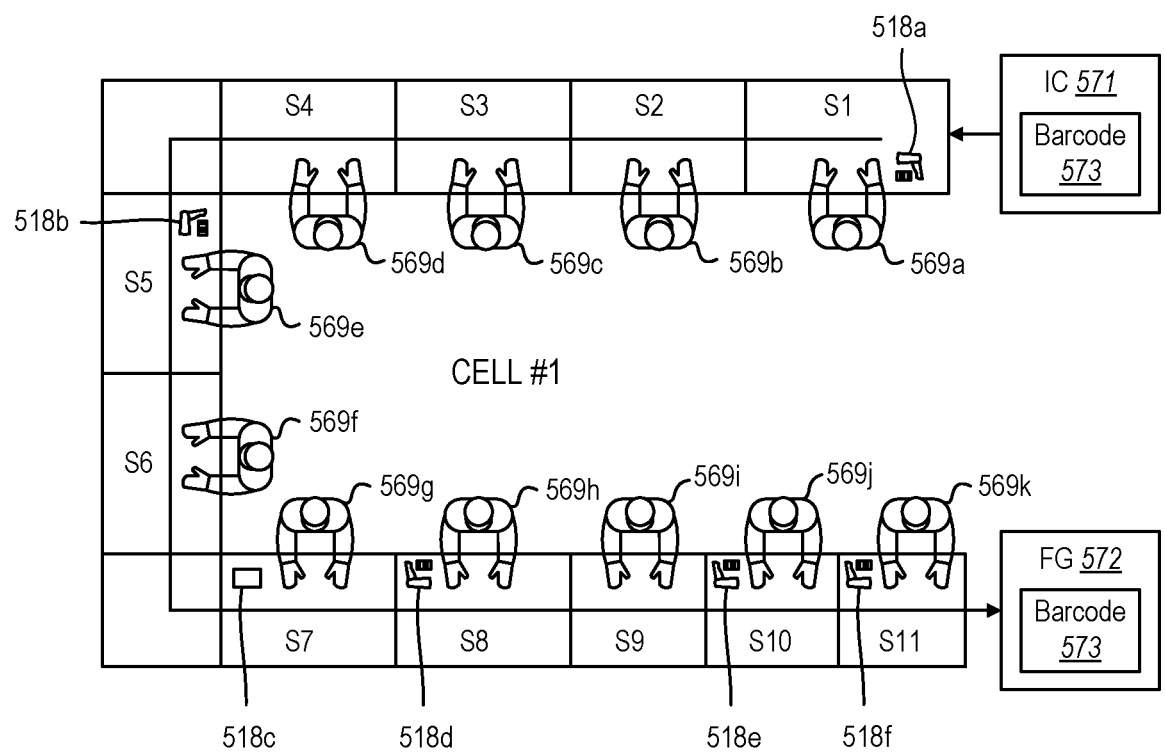
FIG. 5 illustrates a system, which may be an implementation of the system shown in FIG. 1, that includes plurality of stations.

FIG. 5 illustrates a system 500 (which may be an implementation of system 10 of FIG. 1) that includes plurality of stations S1-S11. The stations S1-S11 implement a workflow process. In this context, the term "workflow process" refers to a sequence of operations that is performed to accomplish a particular result. In the example shown in FIG. 5, it will be assumed that the stations S1-S11 are located in a manufacturing facility, and the workflow process is performed for the purpose of assembling a finished goods item 572. Workers 569*a-k* may be located at the various stations S1-S11. The workers 569*a-k* may perform various operations related to assembling the item 572 at the different stations S1-S11. The stations S1-S11 may be structured so that they form an assembly line. The assembly line may begin at station S1 and end at station S11. In other words, the assembly line may be structured so that an initial component (item 571) is initially provided to station S1 and the first operation in the sequence of operations is performed at station S1. After the operation at station S1 has been completed, the item 571 may then be passed to the next station, station S2, and the next operation in the sequence of operations may be performed there. After the operation at station S2 has been completed, the item 571 may then be passed to the next station, station S3, and the next operation in the sequence of operations may be performed there. This process may continue until the item 571 has been transformed to the finished good item 572 and is passed to station S11, which may be a quality testing station, and the final operation, which may be an inspection or test, in the sequence of operations is performed there.

The system 500 includes devices 518*a-f* that are located at some of the stations S1-S11. In particular, devices 518*a-f* are located at stations S1, S5, S7, S8, S10, and S11, respectively. At least some of these devices 518*a-f* may include barcode reading capability. For purposes of the present example, it will be assumed that all devices 518*a-f* (with the exception of 518*c*) include barcode reading capability. Thus, as part of the overall workflow process, barcodes may be read at the stations that include a device with barcode reading capability (e.g., stations S1, S5, S8, S10, and S11 in the present example). A barcode 573 may be attached to the initial component 571 that is being assembled. The barcode 573 may include the serial number of the initial component 571 and may also represent the serial number of the finished good item 572. The barcode 573 may be read at different points in time (e.g., at stations S1, S5, S8, S10, and S11) as the item 571 is moved between the stations S1-S11 during the workflow process.

The devices 518*a-f* in the system 500 may be any of the types of devices 18*a-d* described previously. For example, device 581*c* at station S7 may be a non-barcode reading process management input device 18*d* and at least some of the other devices 518*a-f* with barcode reading capability may be smart barcode readers 18*a* that include process management functionality. At least some of the devices 518*a-f* with barcode reading capability may be wedge devices 18*b* that are connected to barcode readers 28 that do not include process management functionality. At least some of the devices 518*a-f* with barcode reading capability may be mobile devices 18*c* that include a barcode reading application 24 that is configured to perform process management operations.

The devices 518*a-f* may be capable of performing process management operations that enable the efficiency of the workflow process to be evaluated. As discussed above, the process management operations may include determining auxiliary data corresponding to the workflow process. The auxiliary data may include metadata that is generated in connection with reading one or more barcodes 573 during the workflow process. The process management operations may also include sending the auxiliary data to one or more servers, such as the process management servers 25*a-b* and/or the data aggregation servers 33*a-b*.

The system 500 shown in FIG. 5 is provided for purposes of example only, and should not be interpreted as limiting the scope of the present disclosure. Many other types of systems may benefit from the techniques disclosed herein. For example, in some alternative embodiments, devices (such as the devices 518*a-f* in FIG. 5) may be located at each of the stations in the system (instead of just some of the stations, as in FIG. 5). As another example, in some alternative embodiments, machines may be used at some or all of the stations, either instead of or in addition to human workers 569*a-k*. The machines may include robotic components that perform some or all of the operations that are part of the workflow process. In those kinds of embodiments, the devices 518*a-f* (including the devices 518*a-e* with barcode reading capability) may be incorporated into the machines at the stations.

Figure 6:
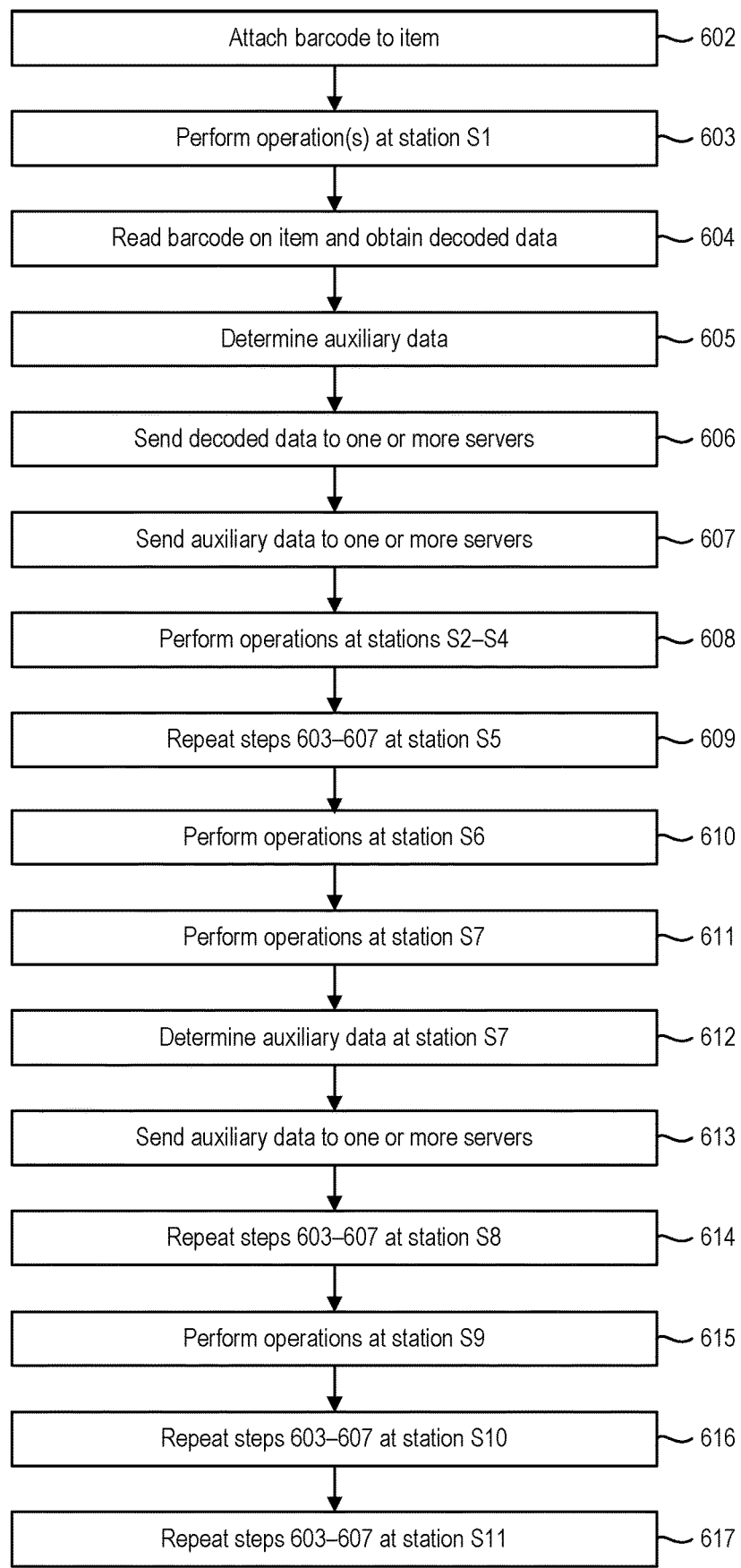
FIG. 6 illustrates an example showing how the devices located at some of the stations in the system shown in FIG. 5 may be used to perform process management operations.

FIG. 6 illustrates an example showing how the devices 518*a-f* located at stations S1, S5, S7, S8, S10, and S11 may be used to perform process management operations in connection with the workflow process that is implemented by the stations S1-S11 in the system 500 of FIG. 5.

As discussed above, the workflow process is performed for the purpose of assembling a finished good item 572 starting with an initial component 571. In step 602, a barcode 573 may be attached to the initial component 571. Encoded within the barcode 573 may be the serial number or other unique identifier of the initial component.

Step 603 represents operations related to the assembly of the item 571 being performed at station S1. For example, the initial component 571 may be "scanned-in" in to the assembly process at station S1 by the worker 569*a*. More specifically, a device 518*a* with barcode reading capability is located at station S1. In step 603, the worker 569*a* at station S1 may perform one or more operations related to the assembly of the initial component 571. In step 604, the worker 569*a* may use the device 518*a* to read the barcode 573 that is attached to the item 571 and obtain decoded data corresponding to the barcode 573. In step 605, the device 518*a* determines auxiliary data corresponding to the workflow process. The auxiliary data may include metadata that is generated when the device 518*a* reads the barcode 573. For example, the auxiliary data may include a timestamp that indicates the time when the device 518*a* reads the barcode 573 (e.g. the time the component with the serial number is "scanned-in" to the assembly line). In step 606, the device 518*a* may send the decoded data (e.g. the serial number of the initial component) to one or more servers, such as the workflow servers 23*a-b* in the system 10 shown in FIG. 1. In step 607, the device 518*a* may send the decoded data and auxiliary data to one or more other servers, such as the process management servers 25*a-b* and/or the data aggregation servers 33*a-b* in the system 10 shown in FIG. 1.

In the present example, it will be assumed that there are no devices that perform process management operations at stations S2-S4. Once the operation(s) at stations S2-S4 have been performed at step 608, then the item 571 may be provided to station S5 and the worker 569*e* at station S5 may perform one or more operations related to the assembly of the item 571. At station S5, a device 518*b* with barcode reading capability, maybe used by worker 569*e*, at step 609 repeat steps 604 to 607. More specifically, in repeating the steps step 603 may represent worker 569*e* performing one or more operation s related to the assembly which in this example may include combining the initial component 571 with another serialized component (e.g. a component with its own serial number. In repeating step 604, reading the barcode may include reading both the barcode 573 on the component and a barcode representing the serial number of the serialized component being combined with the initial component. Repeating step 605 may represent determining auxiliary data which again may be a time stamp. Repeating step 606 may represent sending both the serial number of the initial component (from barcode 573) and the serial number of the serialized component being combined with the initial component to the work flow servers 23*a*-23*b* so that the workflow servers may memorialize the combination of components. Repeating step 607 may represent sending the auxiliary data to the process management servicer 25*a*-25*b*.

Step 610 represents worker 569*f* performing processes at station S6 which includes no process management devices.

Step 611 represents one or more operations related to the assembly of the item 571 being performed at station S7. In the present example, it will be assumed that the device 518*c* at station S7 is a non-barcode reading device 18*d* that does not include barcode reading capability but is capable of performing process management operations. Once the operation(s) at station S7 have been performed, then the worker 569*g* at station S7 may use the device 518*c* to perform one or more process management operations. For example, the device 518*c* may determine auxiliary data at step 612, such as a timestamp indicating the time at which the workflow process at station S7 has completed with respect to the current item 571 being assembled. At step 613 the device 518*c* may send the auxiliary data to one or more servers, such as the process management servers 25*a*-*b* and/or the data aggregation servers 33*a*-*b* in the system 10 shown in FIG. 1. Because the device 518*c* does not include barcode reading capability, the worker 569*g* at station S7 may provide input to the device 518*c* through its user interface (e.g., by pressing a button on the device 518*f*) in order to cause the device 518*c* to determine the auxiliary data and send it to one or more servers.

Step 614 represents steps 603-607 being repeated at station S8. Thus, device 518*d* may be used to read the barcode 573 when the item 571 is at the corresponding station. In particular, the device 518*d* at station S8 may be used to read the barcode 573 after the worker 569*h* at station S8 has performed the relevant operation(s) on the item 571 at station S8. The device 518*d* may also obtain decoded data, determine auxiliary data, and send the decoded data and the auxiliary data to the appropriate destinations (which, as indicated above, may be different from one another).

Step 615 represents one or more operations related to the assembly of the item 571 being performed at station S9. In the present example, it will be assumed that there is not a device that performs process management operations at station S9.

Once the operation(s) at station S9 have been performed, then the item 571 may be provided to station S10. Step 616 represents steps 603-607 being repeated at station S10. The device 518*e* at station S10 may be used to read the barcode 573 after the worker 569*j* at station S10 has performed the relevant operation(s) on the item 571 at station S10. As discussed the barcode 573 may represent the serial number of the device. As such, an exemplary operation at Station S10 may include reading the barcode 573, sending the decoded data (e.g. serial number) to a relevant workflow server 23*a*-23*b*, and receiving at a printer (as directed by the workflow server) a serial number label for placement on the finished item 572.

The device 518*e* may also determine auxiliary data, and send the decoded data and the auxiliary data to the appropriate destinations (which, as indicated above, may be different from one another). For example the serial number and time stamp at which the operator completes the operation may be sent to the process management servers 25*a*-25*b*.

Step 622 represents one or more operations related to the assembly of the item 571 being performed at station S11. In the present example, it will be assumed that station S11 is a quality control station at which the finished item 572 is tested. The device 518*f* at station S11 (which is the end of the assembly line) is a barcode reading device 18*a*-18*c* such that the barcode 573 can be read at the completion of a quality control check, thereby indicating that the finished item 572 is ready for shipment. In more detail, once the operation(s) at station S11 have been performed, then the worker 569*k* at station S11 may use the device 518*f* to perform one or more workflow and process management operations. For example, the device 518*f* may read the barcode and determine auxiliary data, such as a timestamp indicating the time at which the workflow process has completed with respect to the current item 571 being assembled. The device 518*f* may send the auxiliary data to one or more servers, such as the process management servers 25*a*-*b* and/or the data aggregation servers 33*a*-*b* in the system 10 shown in FIG. 1.

FIG. 7 illustrates an example of the auxiliary data 774 that may be collected by the devices 518*a*-*f* in connection with the assembly of various items such as the item 571 shown in FIG. 5. As indicated above, the auxiliary data 774 may include metadata that is determined by the devices 518*a*-*f* as the item 571 moves between the stations S1-S11. As shown in FIG. 7, the metadata may include a plurality of timestamps 775. Each timestamp 775 may be associated with a station ID 776, a user ID 777, and an item ID 778. Each station ID 776 may uniquely identify one of the stations S1-S11. Each user ID 777 may uniquely identify one of the workers 569*a*-*k* at the stations S1-S11. Each item ID 778 (or serial number) may uniquely identify a particular item that is being assembled (or otherwise worked on) at the stations S1-S11. For example, "Item1" may uniquely identify the item 571 shown in FIG. 5, "Item2" may uniquely identify a subsequent item that is assembled at the stations S1-S11, and so forth.

In some embodiments, the item IDs 778 may be included in the barcodes 573 that are attached to the items 571 being assembled. The timestamps 775, station IDs 776, and user IDs 777 may be determined by the devices 518*a*-*f*. The timestamps 775 may be determined by reference to an internal clock 71. The relevant station IDs 776 and user IDs 777 may be programmed into the devices 518*a*-*f*, by the workers 569*a*-*k* and/or by system administrators.

Alternatively, the relevant station IDs 776 may be encoded into a barcode at the particular station. Associating a device 518*a*-518*f* with a station may include reading a barcode with the station ID. Similarly, associating a device 518*a*-518*f* with a user may include reading a barcode with a User ID from a badge or other identification document associated with the user.

Each timestamp 775 may indicate a time at which the barcode 573 is read or another type of input is provided by one of the devices 518*a*-*f*. For example, the timestamp 775*a* associated with station S1 indicates the time at which the worker 569*a* at station S1 uses the device 518*a* at station S1 to read the barcode 573 on the initial component 571.

Similarly, the timestamp 775*b* associated with station S5 indicates the time at which the worker 569*e* at station S5 uses the device 518*b* at station S5 to read the barcode 573 on the item 571.

As another example, the timestamp 775*e* associated with station S7 indicates the time at which the worker 569*g* at station S7 provides input to the device 518*c* that indicates the time at which the workflow process has completed with respect to the item 571.

Although FIG. 5 shows just a single item 571, the workflow process implemented by the stations S1-S11 may be used to assemble (or perform other types of operations in connection with) a plurality of items. A separate barcode (similar to the barcode 573 that is attached to the item 571 shown in FIG. 5) may be attached to each item that is moved along the assembly line formed by the stations S1-S11. The barcode that is attached to a particular item may include information that identifies the item (e.g., an item ID 778).

Thus, in accordance with the present disclosure, a plurality of items may be assembled in accordance with the workflow process implemented by the stations S1-S11. The barcode that is attached to a particular item may be read by the devices 518*a-e* as that particular item moves along the assembly line that is formed by the stations S1-S11. As a plurality of items are assembled, the devices 518*a-e* may be used to read a plurality of different barcodes corresponding to the different items. The devices 518*a-e* may collect auxiliary data 774 including metadata that is generated in connection with reading the barcodes.

As indicated above, the auxiliary data 774 that is collected by the devices 518*a-f* may be sent to one or more servers, such as the process management servers 25*a-b* and/or the data aggregation servers 33*a-b* in the system 10 shown in FIG. 1. The server(s) that receive the auxiliary data 774 may use the auxiliary data 774, including the metadata contained therein, to determine metrics related to the workflow process.

For example, suppose that the local process management server 25*a* receives the auxiliary data 774 from the devices 518*a-f*. The server 25*a* may use the auxiliary data 774 to determine the time duration of one or more operations that are performed at a particular station. To determine this metric, the server 25*a* may calculate the difference between two timestamps 775 corresponding to two sequential barcode reads at the same station. For example, to determine the time duration of the operation(s) performed at station S5 with respect to "Item2," the server 25*a* may calculate the difference between the timestamp 775*a* corresponding to "Item1" and the timestamp 775*c* corresponding to "Item2."

The previous example assumes that the worker at a particular station reads the barcode 573 on the item 571 after the worker has performed the operation(s) on the item 571. Alternatively, the worker at a particular station could read the barcode 573 on the item 571 as soon as the worker receives the item 571 from the previous station, before the worker has performed any operations on the item 571. In such an embodiment, to determine the time duration of the operation(s) performed at station S5 with respect to "Item2," the server 25*a* may calculate the difference between the timestamp 775*d* corresponding to "Item3" and the timestamp 775*c* corresponding to "Item2."

In some embodiments, a minimum amount of time may be defined for the operation(s) that are performed at some or all of the stations. The minimum amount of time associated with a particular station may represent an estimate of the minimum amount of time that is required to adequately perform the operation(s) associated with that station. If the difference between two timestamps 775 corresponding to two sequential barcode reads at the same station is less than this defined minimum, some type of action may be taken. For example, in a manufacturing facility, the current barcode read may be rejected, and a supervisor may be notified. One benefit of defining a minimum amount of time for a particular station is that it discourages workers from taking an unauthorized break and then, upon returning, quickly reading several barcodes corresponding to several items (without performing the operation(s) that are assigned to the station) in an attempt to catch up.

As another example of a metric, the time duration of the operation(s) performed at a particular station may also be calculated as an average. For example, the time duration of the operation(s) performed at station S5 may be determined with respect to various items (e.g., "Item1," "Item2," "Item3," "Item4") in the manner described above. The average value of these metrics may then be calculated in order to determine the average time duration of operation(s) that are performed at station S5.

As another example, the average time duration of one or more operations that are performed at a particular station may be determined for different users. For example, suppose that a change is made to the worker at station S5 after "Item2" is assembled but before "Item3" is assembled. This is reflected in the auxiliary data 774 shown in FIG. 7, in which the user identifier 777 associated with station S5 is "User5" for "Item1", "Item2", and "Item3" and "User12" for "Item4", "Item5", "Item6", and "Item7". The server 25*a* may determine the average time duration of the operation(s) at station S5 for "User5" (by, for example, determining the time duration of the operation(s) at station S5 for "Item1", "Item2" and "Item3" and then taking the average of those values) and also for "User12" (by, for example, determining the time duration of the operation(s) at station S5 for "Item4". "Item5", "Item6" and "Item7," and then taking the average of those values).

Figure 8:
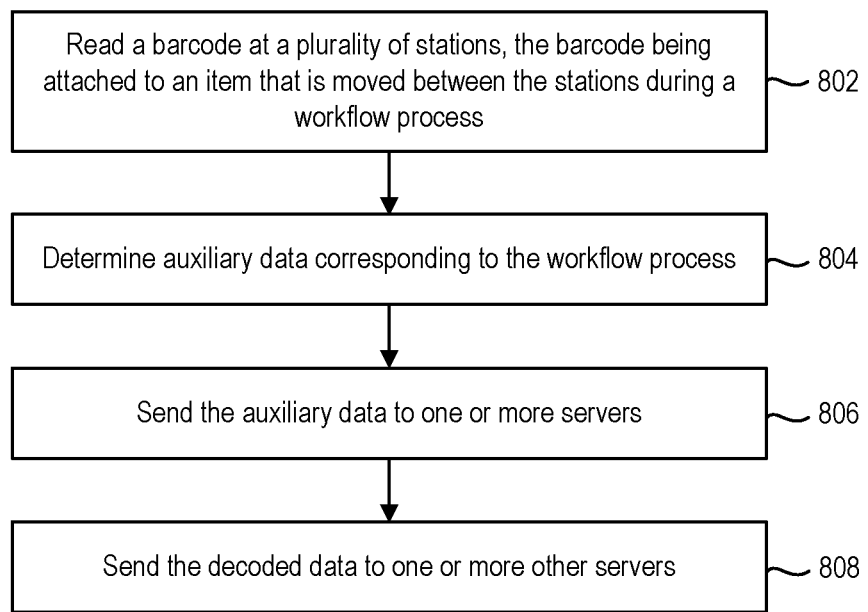
FIG. 8 illustrates a method that may be performed by devices at a plurality of stations that implement a workflow process.

FIG. 8 illustrates a method 800 that may be performed by devices at a plurality of stations that implement a workflow process. For the sake of clarity, the method 800 will be described in connection with the system 500 shown in FIG. 5, which includes stations S1-S11 and devices 518*a-f* at some of the stations.

Step 802 represents reading a barcode 573 at a plurality of stations (e.g., stations S1, S5, S8, S10, and S11 in the system 500 shown in FIG. 5). The barcode 573 may be attached to an item 571 that is moved between the stations S1-S11 during the workflow process.

Step 804 represents determining auxiliary data 774 corresponding to the workflow process. The auxiliary data 774 may include metadata, at least some of which may be generated in connection with reading the barcode 573 at the stations that include devices 518*a-e* with barcode reading capability (e.g., stations S1, S5, S8, S10, and S11 in the system 500 shown in FIG. 5). The metadata may include a plurality of timestamps 775. Each timestamp 775 may be associated with a station ID 776 and may indicate a time at which the barcode 573 is read (or another type of input is provided) at a station corresponding to the station ID 776.

Step 806 represents sending the auxiliary data 774 to one or more servers, such as the process management servers 25*a-b* and/or the data aggregation servers 33*a-b* in the system 10 shown in FIG. 1. Step 808 represents sending the decoded data that is generated in connection with reading the barcode 573 to one or more other servers, such as the workflow servers 23a-b in the system 10 shown in FIG. 1. In other words, the server(s) where the auxiliary data 774 is sent may be different from the server(s) where the decoded data is sent.

Figure 9:
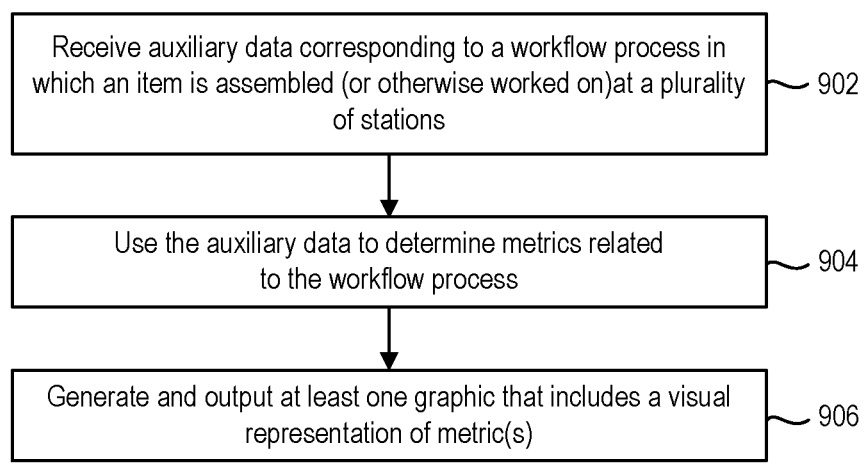
FIG. 9 illustrates a method that may be performed by one or more servers that receive auxiliary data.

FIG. 9 illustrates a method 900 that may be performed by one or more servers (e.g., the process management servers 25a-b and/or the data aggregation servers 33a-b in the system 10 shown in FIG. 1) that receive auxiliary data 774.

Step 902 represents receiving auxiliary data 774 corresponding to a workflow process in which an item 571 is assembled (or otherwise worked on) at a plurality of stations S1-S11. The auxiliary data 774 may be received from a plurality of devices 518a-f that are located at stations that implement the workflow process. The devices 518a-f may be used as part of the workflow process. As discussed above, as part of the workflow process, a barcode 573 that is attached to the item 571 may be read by some or all of the devices 518a-e that include barcode reading capability. Thus, as part of the workflow process, the barcode 573 may be read at those stations where the devices 518a-e are located (e.g., stations S5, S6, S7, S8, S10, and S11 in the system 500 shown in FIG. 5). The auxiliary data 774 may include metadata, at least some of which may be generated in connection with reading the barcode 573 at the stations that include devices 518a-e with barcode reading capability.

Step 904 represents using the auxiliary data 774 to determine metrics related to the workflow process. Various metrics may be calculated, such as the time duration of one or more operations that are performed at a particular station. This type of metric may be determined in connection with the assembly of a particular item 571, or as an average value corresponding to the assembly of a plurality of items. This type of metric may also be determined in connection with different users. Step 906 represents generating and outputting at least one graphic that includes a visual representation of the metric(s) that are determined in step 904.

Figure 10A:
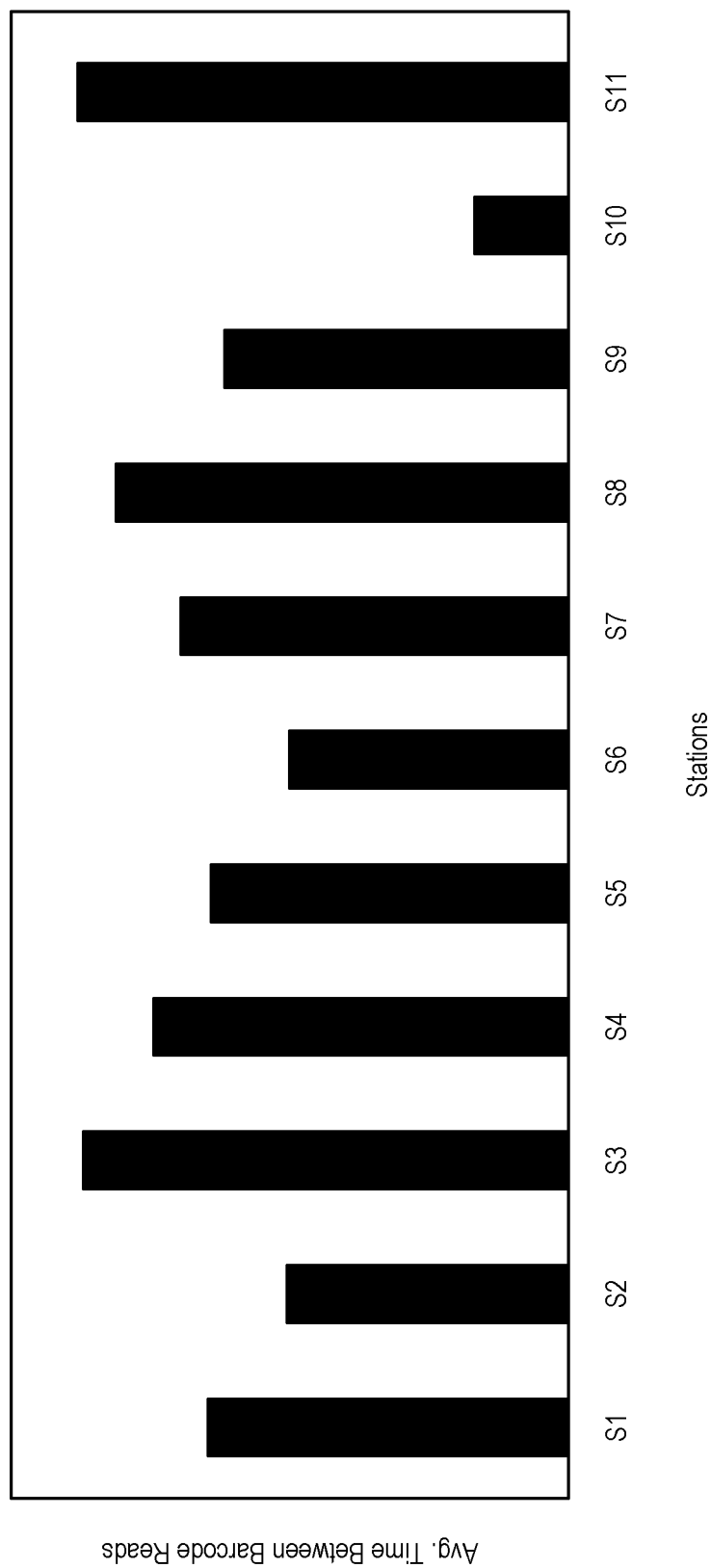
FIGS. 10A-C illustrate examples of graphics that may be generated and rendered in print or digital format to represent one or more metrics related to the workflow process.
Figure 10B:
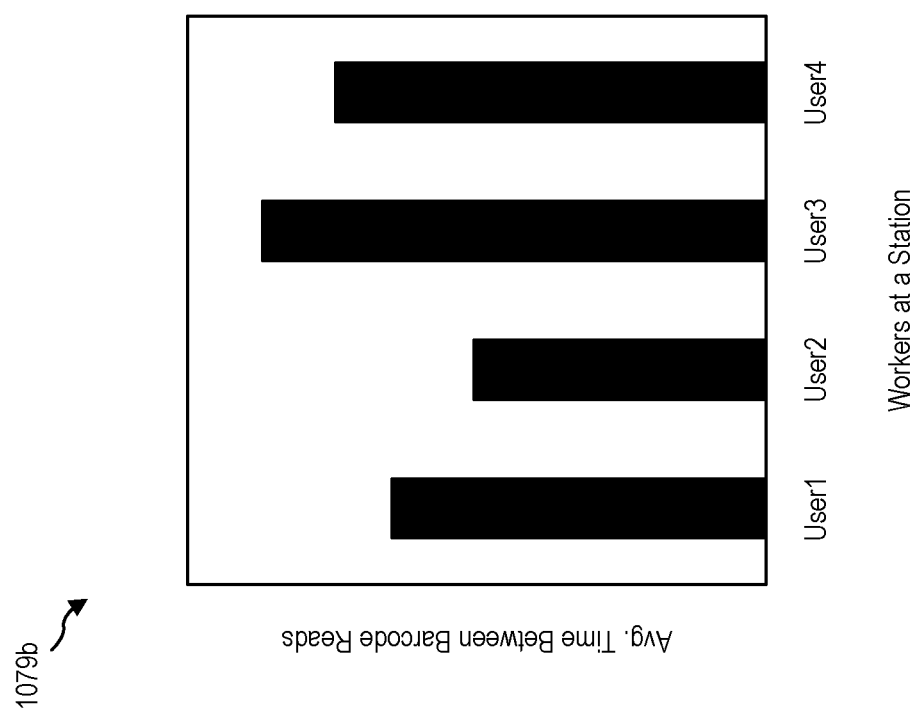
Figure 10C:
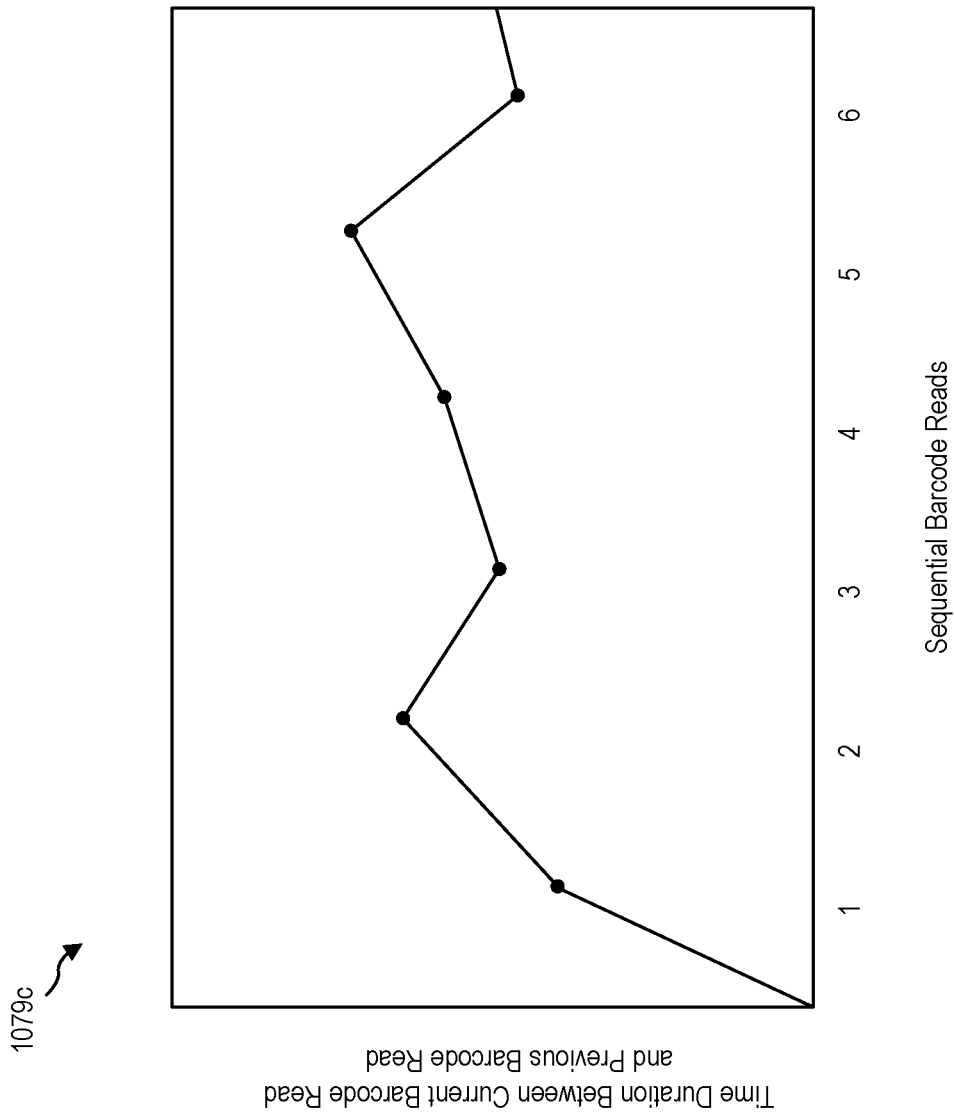

FIGS. 10A-C illustrate examples of graphics that may be generated and rendered in print or digital format to represent one or more metrics related to the workflow process. Reference is initially made to the graphic shown in FIG. 10A, which is a bar chart 1079a. The x-axis of the bar chart 1079a represents different stations (such as the stations S1-S11 in the system 500 shown in FIG. 5). The y-axis of the bar chart 1079a represents the average time between barcode reads at the various stations that are shown along the x-axis. From this bar chart 1079a, it can readily be seen which stations are taking longer than others. For example, the operations that are performed at stations S3 and S11 take significantly longer than the operations performed at station S10.

Reference is now made to the graphic shown in FIG. 10B, which is another bar chart 1079b. The x-axis of the bar chart 1079b represents different people working at a particular station at different times, which are identified as User1, User2, User3, and User4. The y-axis of the bar chart 1079b represents the average time between barcode reads for the various workers that are shown along the x-axis. From this bar chart 1079b, it can readily be seen which workers are more efficient than others. For example, the bar chart 1079b illustrates that User2 is the most efficient while User3 is the least efficient.

Reference is now made to the graphic shown in FIG. 10C, which is a line chart 1079c. The x-axis of the line chart 1079c represents sequential barcode reads at a particular station. For example, the number 1 denotes the first barcode read at a particular station, the number 2 denotes the second barcode read at that particular station, and so forth. The y-axis of the line chart 1079c represents the time difference between the current barcode read at a particular station and the previous barcode read at that particular station. From this line chart 1079c, it can readily be seen how the amount of time that it takes to perform operation(s) at a particular station fluctuates.

The graphics that are shown in FIGS. 10A-C are provided for purposes of example only, and should not be interpreted as limiting the scope of the present disclosure. Those skilled in the art will recognize that many other types of graphics may be generated to represent metric(s) in accordance with the present disclosure.

The graphics that are generated may be output in various ways. For example, the graphics may be displayed on a display device, sent to a printer, etc. If a server (e.g., one of the process management servers 25a-b) generates the graphics, the server may output the graphics to a local display device, a local printer, etc. Alternatively, the server may send the graphics in the form of an electronic file to one or more remote computing devices (e.g., a personal computer, a laptop computer, a tablet computer), which may then display, print, or otherwise output the graphics.

The metrics that are generated in relation to a workflow process (and the corresponding graphics that provide visual representations of the metrics) may be used to improve the workflow process. For example, a graphic like the bar chart 1079a shown in FIG. 10A may illustrate that the operations that are to be performed as part of the workflow process are not evenly distributed among the stations. Consequently, changes may be made so that the operations to be performed at the various stations are more evenly distributed. For example, a graphic like the bar chart 1079b shown in FIG. 10B may illustrate which workers are more efficient than others. This information can be useful for purposes of providing rewards to efficient workers, providing additional training to less efficient workers, etc.

Figure 11:
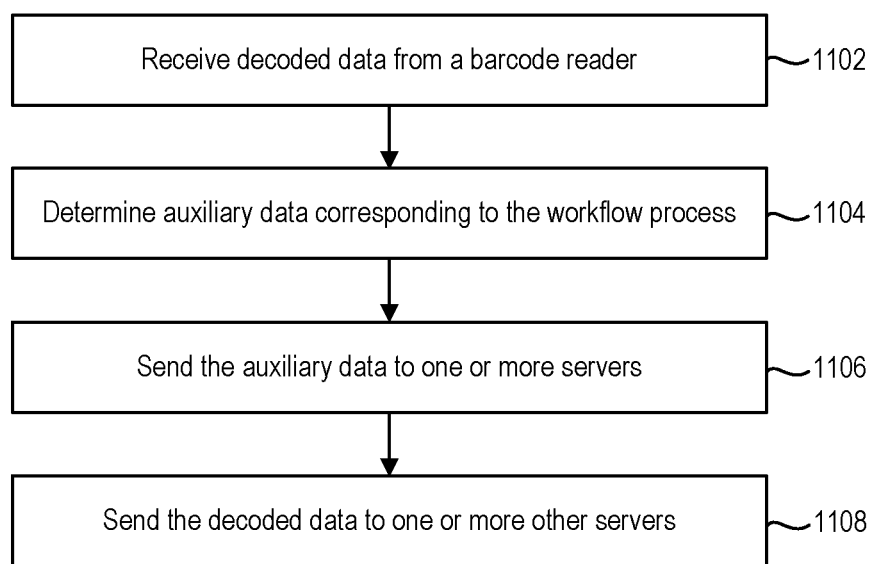
FIG. 11 illustrates a method that may be performed by a smart wedge device.

FIG. 11 illustrates a method 1100 that may be performed by a smart wedge device 18b. As discussed above, a smart wedge device 18b may be configured to be connected to a traditional barcode reader 28 that is not capable of performing process management operations. The smart wedge device 18b may be configured to perform one or more process management operations related to the barcode reading operations that are performed by the barcode reader 28.

Step 1102 of the method 1100 represents receiving decoded data from a barcode reader 28. The method 1100 may be implemented in a system 500 that includes a plurality of stations S1-S11 that implement a workflow process with respect to an item 571. The item 571 may move between the stations S1-S11 during the workflow process. The barcode reader 28 may be located at one of those stations S1-S11. The decoded data that the smart wedge device 18b receives from the barcode reader 28 may correspond to a barcode 573 that is attached to the item 571 and that is read by the barcode reader 28 when the item 571 is located at the station where the barcode reader 28 is located.

Step 1104 of the method 1100 represents determining auxiliary data 774 corresponding to the workflow process. The auxiliary data 774 may include metadata that is generated in connection with reading the barcode 573. For example, the auxiliary data 774 may include a timestamp 775 that indicates the time when the barcode reader 28 reads the barcode 573. The auxiliary data 774 may also include other data associated with the timestamp 775, such as a station ID 776, a user ID 777, and/or an item ID 778.

Step 1106 represents sending the auxiliary data 774 to one or more servers, such as the process management servers 25a-b and/or the data aggregation servers 33a-b in the system 10 shown in FIG. 1. Step 1108 represents sending the decoded data that is generated in connection with reading the barcode 573 to one or more other servers, such as the workflow servers 23a-b in the system 10 shown in FIG. 1. In other words, the server(s) where the auxiliary data 774 is sent may be different from the server(s) where the decoded data is sent.

As discussed above, a minimum amount of time may be defined for the operation(s) that are performed at some or all of the stations. For example, a minimum amount of time may be defined for a quality control station where the worker is supposed to inspect the item that has been assembled and ensure that it meets a certain threshold of quality. However, under some circumstances, workers may be tempted to not perform any type of inspection, but just read the barcode on the item being assembled. For example, a worker may take an unauthorized break and then, upon returning, quickly read several barcodes corresponding to several items (without performing any type of meaningful inspection of the items) in an attempt to catch up. Defining a minimum amount of time between barcode reads can prevent this type of behavior.

As shown in FIG. 1, the local process management server 25a may include a user interface (UI) 81a. Similarly, the remote process management server 25b may include a UI 81b. The UIs 81a-b may enable system administrators to specify a minimum amount of time for one or more stations. For example, referring to the system 500 shown in FIG. 5, suppose that system S11 is a quality control station. Someone involved with the administration of the system (e.g., a manager) may define, via either of the UIs 81a-b, a minimum amount of time between barcode reads for the device 518f at station S11. Once this parameter has been defined, a setting that implements this feature may be pushed down to the device 518f at station S11. For example, suppose that the device 518f at station S11 is a smart barcode reader 18a (as shown in FIG. 1). Once a minimum amount of time between barcode reads has been defined for the device 518f, the process management code 59a (shown in FIG. 1 on the smart barcode reader 18a) on the device 518f may be updated to reflect this setting. After the process management code 59a has been updated in this way, then the process management code 59a prevents the device 518f from reading barcodes too quickly. In other words, the device 518f will not read a new barcode until the minimum time has elapsed from the previous barcode.

Figure 12:
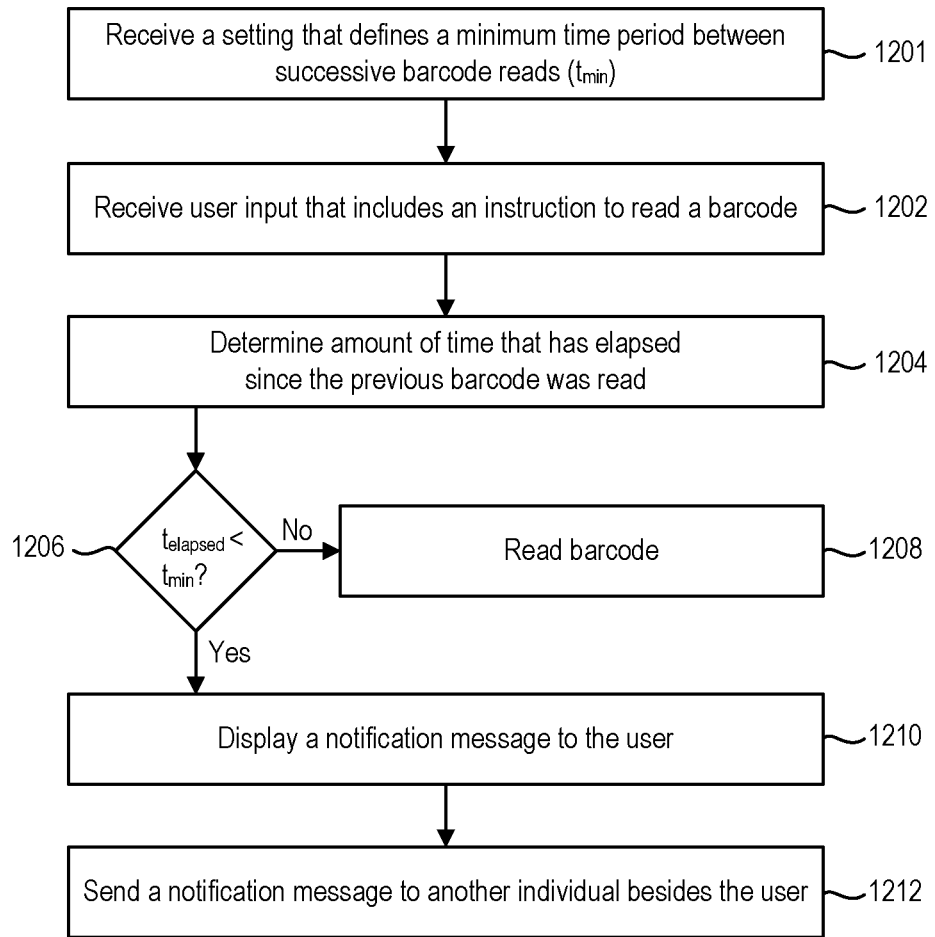
FIG. 12 illustrates an example of a method that may be implemented by a device for which a minimum time period between barcode reads has been defined.

FIG. 12 illustrates an example of a method 1200 that may be implemented by a device (e.g., the device 518f at station S11 in FIG. 5) for which a minimum time period between barcode reads has been defined. This minimum time period may be referred to herein as tmin. In step 1201 of the method 1200, the device 518f receives a setting that defines tmin. In step 1202 of the method 1200, the device 518f receives user input that includes an instruction to read a barcode. In response to receiving this user input, the device 518f determines, in step 1204, the amount of time that has elapsed since the previous barcode was read, which may be referred to herein as telapsed. This information may be stored locally on the device 518f. For example, the device 518f may store timestamps corresponding to the previous N barcode reads, where N may be a user configurable parameter.

In step 1206, the device 518f determines whether telapsed is less than tmin. If not, then in step 1208 the device 518f reads the barcode. After reading the barcode, the device 518f may perform one or more additional operations as described above, such as determining decoded data, determining auxiliary data, and sending the decoded data and the auxiliary data to different destinations.

If, however, in step 1206 the device 518f determines that telapsed is less than tmin, then the device 518f does not read the barcode. In other words, in accordance with the depicted method 1200, the device 518f reads the barcode only if telapsed is greater than or equal to tmin.

In addition to simply not reading the barcode, the device 518f may display and/or send notification messages about the attempt to read the barcode when telapsed is less than tmin. For example, in step 1210, the device 518f may display a notification message to the user of the device 518f (e.g., the worker) indicating that telapsed is less than tmin and that as a result the barcode is not going to be read. This notification message may be displayed on a display screen of the device 518f. Alternatively, instead of sending a notification message, the device 518f may provide another form of output indicating that the barcode will not be read, such as a particular sound.

As another example of a notification message that may be sent, in step 1212, the device 518f may send a notification message to a different device (e.g., a device used by the worker's supervisor). The notification message may indicate that an attempt was made to read a barcode when telapsed is less than tmin.

As discussed above, the auxiliary data that is collected may be used to determine metrics related to the workflow process, such as the average time between barcode reads at a particular station (either as an overall value or in connection with particular users). In accordance with another aspect of the present disclosure, these metrics may be monitored and, under some circumstances, particular actions may be taken when the metrics exceed (or fall below) certain pre-defined threshold values.

Someone involved with the administration of the system (e.g., a manager) may define, via either of the UIs 81a-b on the process management servers 25a-b, one or more threshold values that are relevant to the metrics that will be determined. In addition, one or more actions may be defined in connection with the threshold values. The process management servers 25a-b may then monitor the metrics and take the appropriate action(s) when the threshold value(s) are reached.

For example, suppose that a maximum value is defined for the average time between barcode reads at some or all of the stations that implement the workflow process. The process management servers 25a-b may then monitor that metric in connection with each of the stations for which this maximum value applies. When the metric exceeds the defined maximum value for a particular device located at a particular station, the process management servers 25a-b may take an appropriate action, such as shutting down the particular device (e.g., so that no additional barcode reads will be accepted) until a manager has an opportunity to visit the station and identify the problem.

Figure 13:
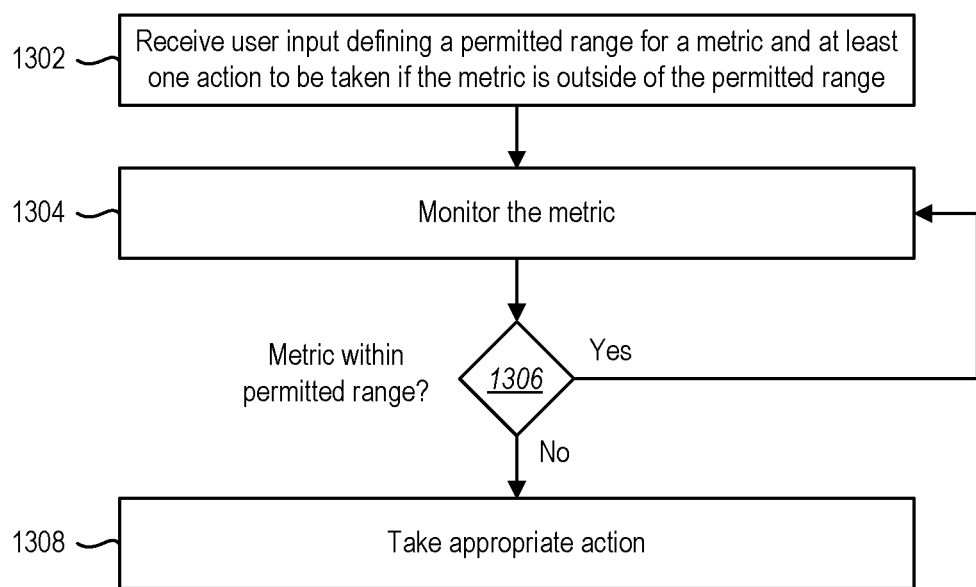
FIG. 13 illustrates an example of a method that may be implemented by a process management server.

FIG. 13 illustrates an example of a method 1300 that may be implemented by a process management server (e.g., either of the process management servers 25a-b in the system 10 of FIG. 1). In step 1302 of the method 1300, user input may be received defining a permitted range for a metric that is determined in connection with the workflow process. In some embodiments, defining the permitted range may include defining a maximum value that the metric should not exceed. Alternatively, or additionally, defining the permitted range may include defining a minimum value below which the metric should not fall.

In step 1304 of the method 1300, the process management server monitors the metric. In step 1306, the process management server determines whether the metric is within the permitted range that has been defined. For example, if the permitted range has been defined in terms of a maximum value, the process management server may determine whether the value of the metric is less than or equal to the maximum value. Alternatively, if the permitted range has been defined in terms of a minimum value, the process management server may determine whether the value of the metric is greater than or equal to the minimum value.

If the process management server determines that the value of the metric has fallen outside of the permitted range, then in step 1308 the process management server performs the action(s) that were previously defined (in step 1302) in connection with the metric. In some embodiments, the action(s) may include deactivating one or more devices at one or more stations. For example, if the average time between barcode reads at a particular station exceeds a defined maximum value, then the process management server may deactivate the device at that station so that no additional barcode reads will be accepted. The device may remain in a deactivated condition until a manager has an opportunity to visit the station and identify what is causing the problem.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
reading a barcode at a plurality of stations during a workflow process, wherein the barcode is attached to an item that is moved between the plurality of stations during the workflow process;
determining auxiliary data corresponding to the workflow process, wherein the auxiliary data comprises metadata that is generated in connection with reading the barcode at the plurality of stations during the workflow process;
sending the auxiliary data to a first server; and
sending decoded data that is generated in connection with reading the barcode to a second server that is different from the first server.

2. The method of claim 1, wherein:
the metadata comprises a plurality of timestamps; and
each timestamp is associated with a station identifier and indicates a time at which the barcode is read or another type of input is provided at a station corresponding to the station identifier.

3. The method of claim 1, wherein:
the plurality of stations are located at a manufacturing facility; and
different operations related to assembly of the item are performed at different stations of the plurality of stations.

4. The method of claim 1, wherein:
a plurality of items are assembled in accordance with the workflow process;
the method further comprises reading each of a plurality of barcodes at the plurality of stations; and
each barcode of the plurality of barcodes is attached to a different item of the plurality of items.

5. The method of claim 1, further comprising:
receiving a setting at a device that is located at one of the plurality of stations, wherein the setting defines a minimum time period between successive barcode reads;
receiving user input at the device, the user input comprising an instruction to read the barcode;
determining an elapsed time period corresponding to an amount of time that has elapsed since the device read a previous barcode; and
reading the barcode only if the elapsed time period is greater than or equal to the defined minimum time period.

6. A wedge device, comprising:
one or more processors; and
memory comprising instructions that are executable by the one or more processors to:
receive decoded data from a barcode reader that is located at a station among a plurality of stations that implement a workflow process, wherein the decoded data corresponds to a barcode that is read by the barcode reader, and wherein the barcode is attached to an item that is moved between the plurality of stations during the workflow process;

determine auxiliary data corresponding to the workflow process, wherein the auxiliary data comprises metadata that is generated in connection with reading the barcode;

send the auxiliary data to a first server; and send the decoded data to a second server that is different from the first server.

7. The wedge device of claim 6, wherein the metadata comprises a timestamp that indicates a time at which the barcode is read at the station.

8. The wedge device of claim 7, wherein:
the metadata further comprises a station identifier corresponding to the station; and
the timestamp is associated with the station identifier.

9. The wedge device of claim 7, wherein:
the metadata further comprises a user identifier corresponding to a user that is working at the station when the barcode is read; and
the timestamp is associated with the user identifier.

10. The wedge device of claim 6, further comprising:
a first communication interface that is configured to communicate with the barcode reader; and
a second communication interface that is configured to communicate with the first server and the second server.

11. The wedge device of claim 6, wherein:
a plurality of items are assembled in accordance with the workflow process;
the instructions are additionally executable by the one or more processors to receive additional decoded data corresponding to a plurality of additional barcodes that are read by the barcode reader; and
each barcode of the plurality of additional barcodes is attached to a different item of the plurality of items.

12. The wedge device of claim 11, wherein the instructions are additionally executable by the one or more processors to:
determine additional auxiliary data corresponding to the workflow process, wherein the additional auxiliary data comprises additional metadata that is generated in connection with reading the plurality of additional barcodes;
send the additional auxiliary data to the first server; and
send the additional decoded data to the second server.

13. The wedge device of claim 12, wherein:
the additional metadata comprises a plurality of sets of metadata;
each set of metadata corresponds to a different item of the plurality of items; and
a set of metadata corresponding to a particular item having a particular barcode comprises a timestamp that indicates a time at which the particular barcode is read at the station during assembly of the particular item.

14. A method, comprising:
receiving decoded data from a barcode reader that is located at a station among a plurality of stations that implement a workflow process, wherein the decoded data corresponds to a barcode that is read by the barcode reader, and wherein the barcode is attached to an item that is moved between the plurality of stations during the workflow process;

determining auxiliary data corresponding to the workflow process, wherein the auxiliary data comprises metadata that is generated in connection with reading the barcode;

sending the auxiliary data to a first server; and sending the decoded data to a second server that is different from the first server.

15. The method of claim 14, wherein the metadata comprises a timestamp that indicates a time at which the barcode is read at the station.

16. The method of claim 15, wherein:
the metadata further comprises a station identifier corresponding to the station; and
the timestamp is associated with the station identifier.

17. The method of claim 15, wherein:
the metadata further comprises a user identifier corresponding to a user that is working at the station when the barcode is read; and
the timestamp is associated with the user identifier.

18. The method of claim 14, wherein:
a plurality of items are assembled in accordance with the workflow process;
the method further comprises receiving additional decoded data corresponding to a plurality of additional barcodes that are read by the barcode reader; and
each barcode of the plurality of additional barcodes is attached to a different item of the plurality of items.

19. The method of claim 18, further comprising:
determining additional auxiliary data corresponding to the workflow process, wherein the additional auxiliary data comprises additional metadata that is generated in connection with reading the plurality of additional barcodes;
sending the additional auxiliary data to the first server; and
sending the additional decoded data to the second server.

20. The method of claim 19, wherein:
the additional metadata comprises a plurality of sets of metadata;
each set of metadata corresponds to a different item of the plurality of items; and
a set of metadata corresponding to a particular item having a particular barcode comprises a timestamp that indicates a time at which the particular barcode is read at the station during assembly of the particular item.

* * * * *